United States Patent
Zemach et al.

(10) Patent No.: US 11,689,440 B2
(45) Date of Patent: Jun. 27, 2023

(54) METHOD AND APPARATUS FOR TRANSMIT TIME TIMESTAMPING

(71) Applicant: Marvell Israel (M.I.S.L) Ltd., Yokneam (IL)

(72) Inventors: Rami Zemach, Givat Shapira (IL); Yaron Kittner, Pardes Hanna-Karkur (IL); Nitzan Dror, Ramot Hashavim (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 16/691,292

(22) Filed: Nov. 21, 2019

(65) Prior Publication Data

US 2020/0252320 A1 Aug. 6, 2020

Related U.S. Application Data

(60) Provisional application No. 62/802,121, filed on Feb. 6, 2019.

(51) Int. Cl.
*H04L 43/06* (2022.01)
*H04L 43/106* (2022.01)
(Continued)

(52) U.S. Cl.
CPC .......... *H04L 43/106* (2013.01); *H04L 7/0008* (2013.01); *H04L 43/16* (2013.01); *H04L 63/0428* (2013.01); *H04L 63/12* (2013.01)

(58) Field of Classification Search
CPC ... H04L 43/106; H04L 43/16; H04L 63/0428; H04L 63/12; H04L 7/0008; H04L 2463/121; H04L 63/123; H04J 3/0661
See application file for complete search history.

(56) References Cited

U.S. PATENT DOCUMENTS 5,394,395 A * 2/1995 Nagai ................. H04L 12/5601
370/395.4
6,507,592 B1 * 1/2003 Hurvig ................ H04L 65/4076
375/E7.021

(Continued)

FOREIGN PATENT DOCUMENTS

DE 10 2008026391 A1 12/2009
EP 2254267 A1 11/2010
(Continued)

OTHER PUBLICATIONS

"Netem," Linux Foundation, (Nov. 2009).
(Continued)

*Primary Examiner* — Steven H Nguyen

(57) ABSTRACT

A network device comprises a network interface configured to transmit packets via a network link, and timestamp circuitry configured to modify a packet that is to be transmitted by the network interface circuitry by embedding a future timestamp in the packet. The future timestamp corresponds to a transmit time at which the packet is to be transmitted by the network interface circuitry, and the transmit time occurs after the timestamp circuitry embeds the timestamp in the packet. Time gating circuitry is configured to i) receive the packet, ii) determine when a current time indicated by a clock circuit reaches the transmit time, iii) hold the packet from proceeding to the network interface circuitry prior to the current time reaching the transmit time, and iv) release the packet in response to the current time reaching the transmit time.

26 Claims, 7 Drawing Sheets

(51) Int. Cl.
*H04L 43/16* (2022.01)
*H04L 9/40* (2022.01)
*H04L 7/00* (2006.01)

(56) References Cited

U.S. PATENT DOCUMENTS

| | | | | |
|---|---|---|---|---|
| 7,257,084 | B1* | 8/2007 | Srinivasan | H04L 45/00 |
| | | | | 370/235 |
| 8,121,116 | B1* | 2/2012 | Healy | H04L 47/564 |
| | | | | 370/389 |
| 8,166,216 | B1 | 4/2012 | Kondapalli | |
| 8,428,045 | B2 | 4/2013 | Gelter et al. | |
| 8,446,896 | B2 | 5/2013 | Bedrosian | |
| 8,644,352 | B1* | 2/2014 | Hutchison | H04L 47/283 |
| | | | | 709/248 |
| 8,670,466 | B1 | 3/2014 | Sathe et al. | |
| 9,042,411 | B1* | 5/2015 | Hutchison | H04J 3/0673 |
| | | | | 709/248 |
| 9,356,721 | B2 | 5/2016 | Haulin | |
| 9,391,728 | B2 | 7/2016 | Haulin | |
| 9,929,928 | B1* | 3/2018 | Dekoos | H04L 43/0852 |
| 2001/0008530 | A1* | 7/2001 | Okamoto | H04L 47/10 |
| | | | | 370/428 |
| 2001/0047425 | A1* | 11/2001 | Saito | H04L 29/06 |
| | | | | 709/236 |
| 2003/0002483 | A1* | 1/2003 | Zwack | H04J 3/0673 |
| | | | | 370/352 |
| 2003/0235216 | A1 | 12/2003 | Gustin | |
| 2004/0008973 | A1 | 1/2004 | Marshall et al. | |
| 2004/0141526 | A1 | 7/2004 | Balasubramanian et al. | |
| 2005/0091024 | A1* | 4/2005 | Patiejunas | H04L 43/50 |
| | | | | 703/14 |
| 2005/0286507 | A1 | 12/2005 | Sterling et al. | |
| 2006/0164902 | A1 | 7/2006 | Fung | |
| 2006/0184797 | A1* | 8/2006 | Weis | H04L 9/12 |
| | | | | 713/178 |
| 2006/0239218 | A1 | 10/2006 | Weis et al. | |
| 2006/0251084 | A1* | 11/2006 | Elliot | H04J 3/0673 |
| | | | | 370/398 |
| 2006/0256720 | A1* | 11/2006 | Curran-Gray | H04L 41/145 |
| | | | | 370/235 |
| 2007/0260906 | A1 | 11/2007 | Corredoura | |
| 2007/0268938 | A1* | 11/2007 | Dowd | H04J 3/0697 |
| | | | | 370/509 |
| 2008/0137691 | A1* | 6/2008 | Barry | H04J 3/0632 |
| | | | | 370/503 |
| 2009/0190589 | A1 | 7/2009 | Bains et al. | |
| 2009/0190613 | A1 | 7/2009 | Finn | |
| 2009/0310729 | A1 | 12/2009 | Liu et al. | |
| 2010/0049964 | A1 | 2/2010 | Kondapalli et al. | |
| 2010/0153742 | A1 | 6/2010 | Kuo et al. | |
| 2010/0162265 | A1 | 6/2010 | Heddes | |
| 2010/0215057 | A1* | 8/2010 | Frink | H04N 21/643 |
| | | | | 370/474 |
| 2010/0309932 | A1 | 12/2010 | Diab et al. | |
| 2011/0228768 | A1 | 9/2011 | Gelter et al. | |
| 2011/0305307 | A1 | 12/2011 | Wang et al. | |
| 2012/0014377 | A1 | 1/2012 | Joergensen et al. | |
| 2012/0082156 | A1 | 4/2012 | Swartzentruber et al. | |
| 2012/0163521 | A1 | 6/2012 | Kirrmann et al. | |
| 2013/0003757 | A1 | 1/2013 | Boatright et al. | |
| 2013/0132554 | A1 | 5/2013 | Armbruster | |
| 2013/0208735 | A1 | 8/2013 | Mizrahi et al. | |
| 2013/0343409 | A1 | 12/2013 | Haulin | |
| 2014/0153588 | A1 | 6/2014 | Haulin | |
| 2016/0182188 | A1* | 6/2016 | Hwang | H04L 1/0057 |
| | | | | 375/240.27 |

FOREIGN PATENT DOCUMENTS

| | | |
|---|---|---|
| WO | WO-2012/065823 A1 | 5/2012 |
| WO | WO-2013/117997 A2 | 8/2013 |

OTHER PUBLICATIONS

"Paragon-X," Calnex Solutions, pp. 1-2 (2010).
"Ptpv2d Project Home Information," pp. 1-3 (2010).
"Weighted mean," Wikipedia, pp. 1-10 (last updated Feb. 2013).
Abdul et al., "Integration of HSR and IEEE1588 over Ethernet networks," Proc. of the 2010 Int'l IEEE Symposium on Precision Clock Synchronization for Measurement, Control and Communication, pp. 77-82 (Sep. 27-Oct. 1, 2010).
Abstract of IEEE 802.1AS Standard, "802.1AS—Timing and Synchronization," *The Institute of Electrical and Electronics Engineers, Inc.*, available at <http://www.ieee802.org/1/pages/802.1as.html>, 1 page (Nov. 11, 2010).
Alizadeh et al., "DCTCP: Efficient packet transport for the commoditized data center," SIGCOMM, pp. 1-15 (2010).
Appenzeller et al., "Sizing router buffers," SIGCOMM, pp. 1-15 (2004).
Chin et al., "IEEE 1588 Clock Synchronization using Dual Slave Clocks in a Slave," IEEE Communications Letters, vol. 13, No. 6, pp. 456-458 (Jun. 2009).
Corlett et al. "Statistics of One• Way Internet Packet Delays", Internet Engineering Task Force, available at http://tools.ietf.org/id/draft-corlett-statistics-of-packet-delays-00.txt, pp. 1-9 (Aug. 2002).
ETSI EN 300 912, V8.3.1, "Digital Cellular Telecommunications System (Phase 2+); Radio Subsystem Synchronization," (GSM 05.10 version 8.3.1 Release 1999), *European Telecommunications Standards Institute*, pp. 1-24 (Oct. 2000).
Gurewilz et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044, (2001).
Gurewitz et al., "One-Way Delay Estimation Using Network Wide Measurements," IEEE Trans. on Information Theory, vol. 52, No. 6, pp. 2710-2724 (2006).
IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).
IEEE P802.1AS/D0.8, "Draft Standard for Local and Metropolitan Area Networks-Timing and Synchronization for Time—Sensitive Applications in Bridged Local Area Networks," *The Institute of Electrical and Electronics Engineers, Inc.*, pp. 1-149 (May 25, 2007).
IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, pp. 1-196 (Oct. 2004).
IEEE Std. 1588™—2008 (Revision of IEEE Std. 1588-200), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).
IEEE Std. C37.238™—2011, "IEEE Standard Profile for Use of IEEE 1588™ Precision Time Protocol in Power System Applications," *Institute for Electrical and Electronics Engineers, Inc.*, pp. 1-66 (Jul. 2011).
ITU Recommendation G.707/Y.1322, "Network node interface for the synchronous digital hierarchy (SDH)," *Int'l Telecommunication Union* , pp. 1-196 (Jan. 2007).
ITU Recommendation G.707/Y.1322, Amendment 2, "Network node interface for the synchronous digital hierarchy (SDH)," *Int'l Telecommunication Union* , pp. 1-10 (Nov. 2009).
ITU Recommendation G.781, Synchronization layer functions, *Int'l Telecommunication Union*, pp. 1-124 (Sep. 2008).
ITU Recommendation G.781, Corrigendum 1, "Synchronization layer functions, Corrigendum 1," *Int'l Communication Union*, pp. 1-8 (Nov. 2009).

(56) References Cited

OTHER PUBLICATIONS

ITU Recommendation G.811, "Timing Characteristics of Primary Reference Clocks," Int'l Telecommunication Union, pp. 1-11 (Sep. 1997).

ITU Recommendation G.812 "Timing requirements of slave clocks suitable for use as node clocks in synchronization networks," Int'l Telecommunication Union, pp. 1-46 (Jun. 2004).

ITU Recommendation G.812, Erratum 1/Covering Note, "Timing requirements of slave clocks suitable for use as node clocks in synchronization networks" Int'l Communication Union, 1 page (Mar. 2005).

ITU Recommendation G.823 "The control of jitter and wander within digital networks which are based on the 2048 kbit/s hierarchy," Int'l Telecommunication Union, pp. 1-50 (Mar. 2000).

ITU Recommendation G.8261/Y.1361 "Timing and synchronization aspects in packet networks," Int'l Telecommunication Union, pp. 1-64 (May 2006).

ITU Recommendation G.8261/Y.1361, Amendment 1, "Timing and synchronization aspects in packet networks—Amendment 1: Network jitter limits for the synchronous Ethernet equipment clock interface and other clarifications" Int'l Telecommunication Union, pp. 1-14 (Jul. 2010).

ITU Recommendation G.8261/Y.1361, Corrigendum 1, "Timing and synchronization aspects in packet networks—Corrigendum 1," Int'l Telecommunication Union, pp. 1-6 (Dec. 2006).

ITU Recommendation G.8262/Y.1362 "Timing characteristics of synchronous Ethernet equipment slave clock (EEC)," Int'l Telecommunication Union, pp. 1-34 (Jul. 2010).

ITU Recommendation G.8262/Y.1362, Amendment 1, "Timing characteristics of synchronous Ethernet equipment slave clock—Amendment 1," Int'l Telecommunication Union, pp. 1-8 (Feb. 2012).

ITU Recommendation G.8262/Y.1362, Amendment 2, "Timing characteristics of synchronization Ethernet equipment slave clock—Amendment 2," Int'l Telecommunication Union, pp. 1-12 (Oct. 2012).

ITU Recommendation G.8264/Y.1364 "Distribution of timing through packet networks," Int'l Telecommunication Union, pp. 1-36 (Oct. 2008).

ITU Recommendation G.8264/Y.1364, Amendment 1, "Distribution of timing through packet networks—Amendment 1: Use of synchronous Ethernet in a multi-operator context," Int'l Telecommunication Union, pp. 1-10 (Sep. 2010).

ITU Recommendation G.8264/Y.1364, Corrigendum 1, "Distribution of timing through packet networks—Corrigendum 1," Int'l Telecommunication Union, pp. 1-10 (Nov. 2009).

ITU Recommendation G.8264/Y.1364, Amendment 2, "Distribution of timing through packet networks—Amendment 2," Int'l Telecommunication Union, pp. 1-8 (Feb. 2012).

ITU Recommendation G.8264/Y.1364, Corrigendum 2, "Distribution of timing through packet networks—Corrigendum 2," Int'l Telecommunication Union, pp. 1-8 (Feb. 2012).

ITU-T Recommendation G.8265.1/Y.1365.1, "Precision time protocol telecom profile for frequency synchronization," Int'l Telecommunication Union, pp. 1-28 (Oct. 2010).

IEC 62439-3, "Industrial communication networks—High availability automation networks—Part 3: Parallel Redundancy Protocol (PRP) and High-availability Seamless Redundancy (HSR)," International Electrotechnical Commission, pp. 1-62 (2010).

Lee, "An Enhanced IEEE 1588 Time Synchronization Algorithm for Asymmetric Communication Link Using Block Burst Transmission", IEEE Communications Letters, vol. 12, No. 9, pp. 687-689 (Sep. 2008).

Lv et al., "An Enhanced IEEE 1588 Time Synchronization for Asymmetric Communication Link in Packet Transport Network," IEEE Communications Letters, vol. 14. No. 8. pp. 764-766 (Aug. 2010).

Mills, "Internet Time Synchronization: The Network Time Protocol," Network Working Group Request for Comments, No. 1129, pp. 1-27 (Oct. 1989).

Mills et al., "Network Time Protocol Version 4: Protocol and Algorithms Specification," Request for Comments: 5905, Internet Engineering Task Force (IETF), pp. 1-111 (Jun. 2010).

Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS) (Sep. 24, 2012).

Mizrahi, "A Game Theoretic Analysis of Delay Attacks against Time Synchronization Protocols," Precision Clock Synchronization for Measurement, Control and Communication (ISPCS), International IEEE Symposium, pp. 1-6 (2012).

Mukherjee, "On the Dynamics and Significance of Low Frequency Components of Internet Load," Internetworking: Research and Experience, vol. 5, No. 4. pp. 163-205 (1992).

Paxson, "End-to-End Internet Packet Dynamics," IEEE/ACM Transactions on Networking, vol. 7(3), pp. 277-292 (1999).

Shpiner et al., "Multi-Path Time Synchronization," Internet Engineering Task Force (IETF), pp. 1-15 (Oct. 15, 2012).

Simanic et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24 (2011).

TIA/EIA-95-B, TR45 "Mobile Station-Base Station Compatibility Standard for Dual-Mode Wideband Spread Spectrum Systems," SP-3693-1, pp. 1-1202 (Oct. 1, 1998).

Tournier et al., "Precise Time Synchronization on a High Available Redundant Ring Protocol," ISPCS 2009 International IEEE Symposium on Precision Clock Synchronization for Measurement, Control and Communication, Brescia, Italy. pp. 1-4 (Oct. 12-16, 2009).

Weber et al., "High availability seamless automation ring (Draft IEC 62439-3) and IEEE 1588 time sync dependencies," Institute for Electrical and Electronics Engineers, Inc. (Oct. 2010).

Zarick et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140, (Sep. 27-Oct. 1, 2010).

Zhang et al., "PDV-based PTP LSP Setup, Reoptimization and Recovery," Internet Engineering Task Force (Oct. 2011).

ITU Recommendation G.707/Y.1322, "Implementers Guide for definitions and terms found in Recommendation ITU-T G.707/Y.1322," Int'l Telecommunication Union, pp. 1-6 (Jun. 2010).

ETSI EN 300 912, v7.3.0 draft, "Digital Cellular Telecommunications System (Phase 2+); Radio Sybsystem Synchronization," (GSM 05.10 version 7.3.0 Release 1998), European Tellecommunications Standards Institute, pp. 1-24 (Oct. 2000).

ETSI TR 125 951, v7.0.0, "Universal Mobile Telecommunications System (UMTS); Base Station (BS) Classification" (3GPP TR 25.951 version 7.0.0 Release 7), European Telecommunications Standards Institute, pp. 1-63 (Jun. 2007).

ETSI TS 125 105, v11.1.0, "Universal Mobile Telecommunications System (UMTS)"; Base Station (BS) Radion Transmission and Reception (TDD), (3GPP TS 25.105 version 11.1.0 Release 11), European Telecommunications Standards Institute, pp. 1-121 (Oct. 2012).

ETSI TS 125 402, v3.0.0, "Universal Mobile Telecommunications System (UMTS); Syncronization in UTRAN Stage 2," (3G TS 25.402 version 3.0.0 Release 1999), European Telecommunications Standards Institute, pp. 1-30 (Jan. 2000).

ETSI TS 125 402, v4.3.0, "Universal Mobile Telecommunications System (UMTS); Synchronization in UTRAN Stage 2," (3GPP TS 25.402 version 4.3.0 Release 4), European Telecommunications Standards Institute, pp. 1-44 (Dec. 2001).

\* cited by examiner

METHOD AND APPARATUS FOR TRANSMIT TIME TIMESTAMPING

CROSS REFERENCES TO RELATED APPLICATIONS

This application claims the benefit of U.S. Provisional Patent Application No. 62/802,121, entitled "Forward Timestamping," filed on Feb. 6, 2019, which is incorporated herein by reference in its entirety.

FIELD OF TECHNOLOGY

The present disclosure relates generally to communication networks, and more particularly to devices and techniques for timestamping packets to be transmitted in a communication network.

BACKGROUND

In a communication network, it is often useful for different nodes in the communication network to use clocks that are synchronized across the communication network, and several applications require precise synchronization of clocks across the communication network. For example, a security application may require that security key changes occur simultaneously across the communication network. As another example, nodes in an industrial communication network may time-share a shared resource in the network according to a time schedule. As yet another example, some telemetry techniques may time-share locations in a packet to store different types of packet information as a function of a time at which a packet is transmitted. In any of these and similar methods, network nodes require accurately synchronized clocks in order to correctly provide time based functionalities.

The Precision Time Protocol (PTP) defines a scheme for distributing an accurate time across a communication network. In PTP, a general master (GM) maintains an accurate source time clock. Additionally, nodes in the network exchange timestamped packets to determine transmit latencies between pairs of nodes. In particular, a transmit node typically adds a timestamp to a packet immediately prior to transmitting the packet, where the timestamp indicates a transmit time of the packet. A node that receives the packet then uses the timestamp in the packet and a receive time of the packet to measure a transmit latency between the transmit node and the receive node.

With PTP, a current value of the source time clock of the GM is distributed through the communication network so that nodes can synchronize their local clocks, and each node adjusts its local clock to account for a transmit latency associated with a path through the network by which the value of the source time clock was received.

Some communication networks use security techniques to protect transmitted data from tampering and/or to obscure transmitted data from third parties. For example, a transmitting node may generate authentication data using contents of a packet (e.g., the transmitting node applies a hash function to contents of the packet to generate a hash value), and then includes the authentication data in the packet (or a subsequent packet). When a receiving node receives the contents of the packet and the authentication data, the receiving node regenerates the authentication data using the contents of the received packet, and compares the regenerated authentication data with the received authentication data. If the regenerated authentication data is different than the received authentication data, the receiving node may determine that the contents of the received packet are not accurate.

Similarly, a transmitting node may encrypt contents of a packet prior to transmitting the packet. The encryption obscures the content so that third parties cannot understand the meaning of the content. When a receiving node receives the packet, the receiving node decrypts the encrypted contents of the packet to obtain the original content. If the encrypted contents have been modified prior to reaching the receiving node, the decryption process will result in unintelligible information, and the receiving node will assume that the contents of the received packet are not accurate.

If a transmitting node adds a timestamp to a packet after the transmitting node has applied authentication/encryption to contents of the packet, the timestamp will not be protected by the authentication/encryption leaving the timestamp vulnerable to view/modification by a malicious third party. For example, a malicious third party may attempt to use/modify timestamps in transmitted packets to affect the timing of actions in a communication network.

On the other hand, if a transmitting node adds a timestamp to a packet prior to the transmitting node applying authentication/encryption to contents of the packet, the timestamp will not accurately reflect the transmit time of the packet because of a latency caused by applying the authentication/encryption. Inaccurate timestamps will reduce the degree of synchronization of clocks in the communication network, which may adversely affect applications that require precise synchronization of clocks across the communication network.

SUMMARY

In an embodiment, a network device comprises: a network interface configured to transmit packets via a network link; and timestamp circuitry configured to modify a packet that is to be transmitted by the network interface circuitry by embedding a future timestamp in the packet. The future timestamp corresponds to a transmit time at which the packet is to be transmitted by the network interface circuitry, and the transmit time occurs after the timestamp circuitry embeds the timestamp in the packet. The network device further comprises time gating circuitry that includes, or is coupled to, a clock circuit. The time gating circuitry is configured to i) receive the packet, ii) determine when a current time indicated by the clock circuit reaches the transmit time, iii) hold the packet from proceeding to the network interface circuitry prior to the current time reaching the transmit time, and iv) release the packet in response to the current time reaching the transmit time.

In another embodiment, a method for transmitting packets includes: receiving, at a network device, a packet that is to be transmitted via a network interface of the network device; and modifying, with timestamping circuitry, the packet by embedding a timestamp in the packet. The timestamp corresponds to a transmit time at which the packet is to be transmitted by the network interface, and the transmit time occurs after the timestamping circuitry embeds the timestamp in the packet. The method also includes determining, at the network device, when a current time reaches the transmit time, the current time generated by a clock circuit of the network device. The method further includes: holding, at time gating circuitry of the network device, the packet from proceeding to the network interface prior to the current time reaching the transmit time; and releasing, by the time gating circuitry, the packet to the network interface in response to that the current time has reached the transmit time.

DETAILED DESCRIPTION

In embodiments described below, timestamping circuitry in a network device embeds a future timestamp in a packet, the future timestamp corresponding to a future transmit time at which the packet is to be transmitted by the network device. Time gating circuitry of the network device receives the packet and compares a current time generated by a clock with the transmit time. In some embodiments time gating circuitry determines the future transmit time based on the embedded future timestamp, while in other embodiments the future transmit time is provided to the time gating circuitry by the timestamp generator separately from the embedded timestamp. The time gating circuitry prevents the packet from being transmitted prior to the current time reaching the future transmit time, and releases the packet for transmission when the current time reaches the future transmit time. Thus, the packet is transmitted at a time that closely corresponds to the timestamp in the packet, according to embodiments described below.

Figure 1A:
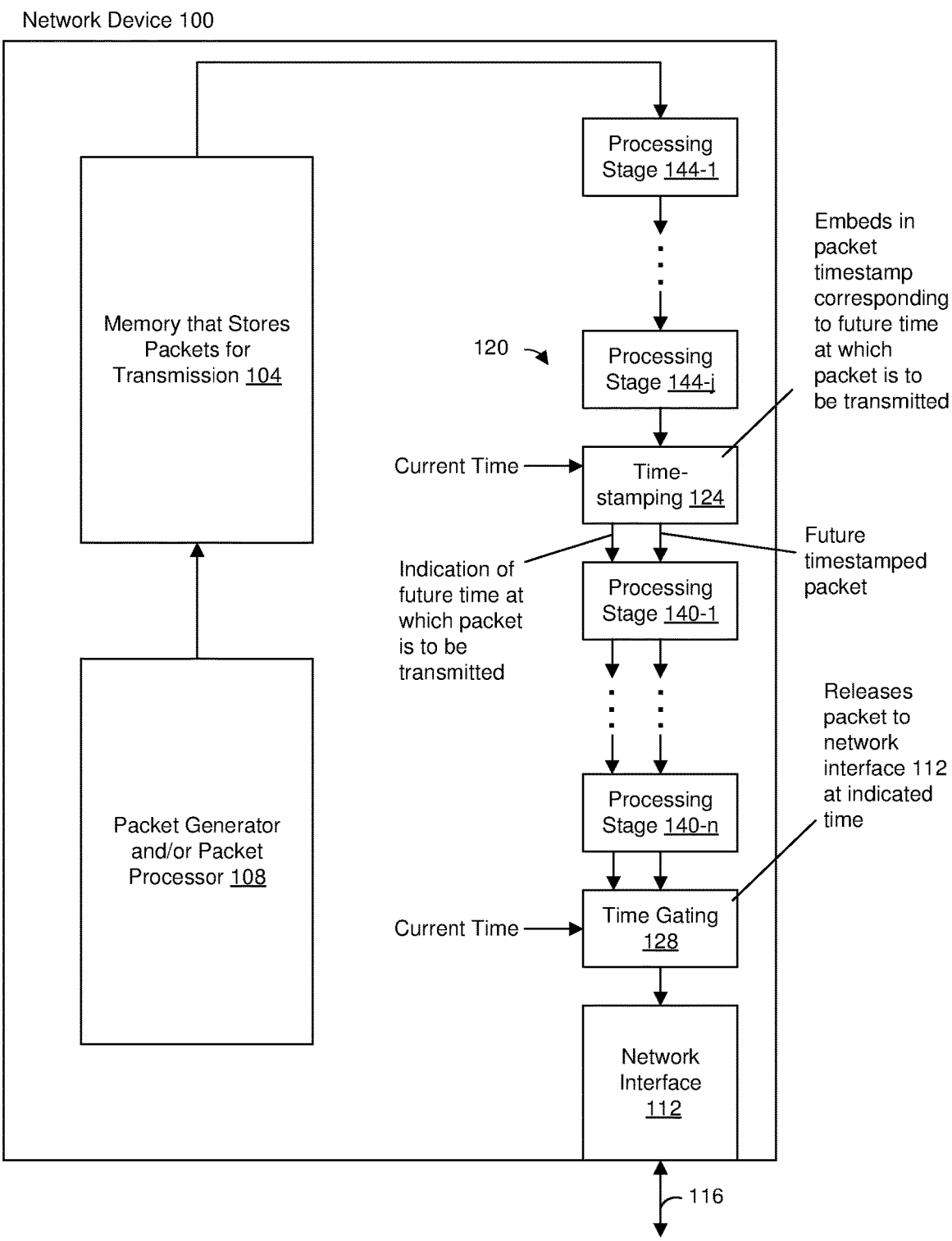
FIG. 1A is a block diagram of an example network device that embeds a future timestamp in a packet and releases the packet for transmission when a current time reaches a transmit time corresponding to the future timestamp, according to an embodiment.

FIG. 1A is a diagram of a simplified diagram of an example network device 100 that transmits timestamped packets in a communication network, according to an embodiment. In some embodiments, the network device 100 is an endpoint device that generates and transmits packets in a communication network. Illustrative examples of endpoint devices include a personal computer, a tablet computer, a mobile communication device, a sensor device, an industrial device in a factory, etc. In other embodiments, the network device 100 is a forwarding device that receives packets and forwards the packets via a plurality of network interfaces such as ports. Illustrative examples of forwarding devices include switches, routers, bridges, repeaters, access points, etc.

The network device 100 includes a memory 104 to store packets that are to be transmitted by the network device 100. For example, the memory 104 may act as a transmit queue for storing packets until a communication link is available for transmitting the packets. In various embodiments, the memory 104 comprises a random access memory (RAM) or another suitable type of memory device.

The network device 100 also includes a packet generator and/or packet processor 108. For example, when the network device 100 is an endpoint device, the network device 100 includes a packet generator 108 that generates the packets for transmission and stores the packet in the memory 104, according to an embodiment. As another example, when the network device 100 is a forwarding device, the network device 100 includes a packet processor 108 that analyzes packets received by the network device 100 to determine network interfaces (e.g., ports) of the network device 100 via which the packets are to be transmitted, according to an embodiment. In some embodiments, the packet processor 108 modifies packets stored in the memory 104, such as modifying headers of packets in the memory 104.

The network device 100 also includes a network interface 112 coupled to a communication link 116. In an embodiment, the communication link 116 is a fiber optical link and the network interface 112 comprises an optical port. In another embodiment, the communication link 116 is a wired communication link and the network interface 112 comprises an Ethernet port. In another embodiment, the communication link 116 is a wireless communication link and the network interface 112 comprises a wireless network interface. In other embodiments, other suitable network interfaces 112 and communication links 116 are used. In various embodiments, the network interface 112 includes one of, or any suitable combination of two or more of, a digital-to-analog converter (DAC), a digital-to-optical converter, an amplifier, a modulator, etc. (not shown), to covert a digital signal corresponding to a packet to an analog/optical signal suitable for transmission via the communication link 116.

Packets read from the memory 104 are provided to the network interface 112 for transmission via the communication link 116. Prior to transmission via the communication link 116, packets read from the memory 104 are processed by a plurality of processing stages 120. The plurality of processing stages 120 are arranged in series, for instance as a processing pipeline, and process packets in an order, according to an embodiment. In some embodiments, the plurality of processing stages 120 also includes one or more parallel branches (not shown) in which respective processing stages selectively operate on a packet depending the branch via which the packet traverses.

In an embodiment, a direct memory access (DMA) circuit (not shown) reads packets from the memory 104 and provides the packets to the plurality of processing stages 120.

The plurality of processing stages 120 includes time stamping circuitry 124 that is configured to modify a packet to embed a timestamp in the packet. The timestamp embedded in the packet by the time stamping circuitry 124 corresponds to a future time at which the packet is to be transmitted via the network interface 112 (sometimes referred to herein as a "transmit time" for a packet). For example, the future time (or transmit time) corresponds to a time offset added to a current time at which the packet is received at the time stamping circuitry 124, where the time offset corresponds to a maximum latency of one or more processing stages in the plurality of processing stages 120 that are to process the packet after the time stamping circuitry 124.

The time stamping circuitry 124 is also configured to generate timing information, separate from the timestamp in the packet, that indicates the transmit time, according to an embodiment. As will be discussed below, the timing information (separate from the timestamp in the packet) is for use by time gating circuitry 128 in the plurality of processing stages 120. In particular, the time gating circuitry 128 uses the timing information to determine when a packet is to be released to the network interface 112, as will be described below.

In an embodiment, the time stamping circuitry 124 outputs the timing information separately from the packet, e.g., via a first output of the time stamping circuitry 124, which is separate from a second output of the time stamping circuitry 124 that outputs the packet that includes the timestamp. In another embodiment, the timing information is appended to the packet, e.g., in a tag appended to the packet, the tag being removed from the packet prior to transmitting the packet via the network interface 112 so that the tag is not transmitted via the network interface 112.

In some embodiments, the time stamping circuitry 124 does not timestamp every packet that is processed by the plurality of processing stages 120, e.g., the time stamping circuitry 124 selectively timestamps packets. For example, the packet generator/packet processor 108 determines which packets are to be timestamped and informs the time stamping circuitry 124 of which packets are to be timestamped, according to an embodiment. In an embodiment, the time stamping circuitry 124 receives timestamping control information (e.g., from the packet generator/packet processor 108) separate from the packet but corresponding to the packet, the timestamping control information indicating whether the time stamping circuitry 124 is to timestamp the packet. In another embodiment, the timestamping control information (e.g., from the packet generator/packet processor 108) is appended to the packet, e.g., in a tag appended to the packet. In an embodiment in which the packet received by the time stamping circuitry 124 includes a tag that indicates the packet is to be timestamped, the time stamping circuitry 124 modifies the tag to include the transmit time in the tag, and separate from the timestamp in the packet. In another embodiment in which the packet received by the time stamping circuitry 124 includes a tag that indicates the packet is to be timestamped, the time stamping circuitry 124 adds an additional tag to the packet, the additional tag including the transmit time. In another embodiment in which the packet received by the time stamping circuitry 124 includes a tag that indicates the packet is to be timestamped, the time stamping circuitry 124 removes the tag and adds a new tag to the packet, the new tag including the transmit time.

In an embodiment, when the timestamping control information indicates that the packet is to be timestamped, the time stamping circuitry 124 includes a timestamp in the packet as discussed above; on the other hand, when the timestamping control information indicates that the packet is not to be timestamped, the time stamping circuitry 124 does not include a timestamp in the packet.

In an embodiment, when the timestamping control information indicates that the packet is not to be timestamped, the time stamping circuitry 124 generates the timing information to be used by the time gating circuitry 128 (as discussed above) so that the time gating circuitry 128 immediately releases the packet to the network interface 112. For example, when the timestamping control information indicates that the packet is not to be timestamped, the time stamping circuitry 124 generates the timing information to indicate the current time or a past time, according to an embodiment. In another embodiment, when the timestamping control information indicates that the packet is not to be timestamped, the time stamping circuitry 124 sets the timing information to a predetermined value that indicates to the time gating circuitry 128 that the time gating circuitry 128 should immediately release the packet to the network interface 112.

In another embodiment, the timestamping control information is also provided to the time gating circuitry 128, and when the timestamping control information indicates that the packet is not to be timestamped, the time gating circuitry 128 immediately releases the packet to the network interface 112.

The time gating circuitry 128 is configured to i) receive the packet that is to be transmitted via the network interface 112, ii) receive the timing information (which indicates the transmit time for the packet) from the time stamping circuitry 124, iii) hold the packet from proceeding to the network interface 112 prior to a current time reaching the transmit time, and iv) release the packet to the network interface 112 in response to the current time reaching the transmit time, according to an embodiment. Because the time gating circuitry 128 releases the packet to the network interface 112 when the current time reaches the transmit time (which corresponds to the timestamp in the packet), the timestamp in the packet more accurately reflects the actual transmit time of the packet.

In some embodiments in which the timestamping circuitry 124 appends the timing information to the packet, e.g., in a tag appended to the packet, the time gating circuitry 128 is configured to remove the appended timing information from the packet prior to releasing the packet to the network interface 112.

In an embodiment, when the timing information is set to a predetermined value that indicates to the time gating circuitry 128 that the time gating circuitry 128 should immediately release the packet to the network interface 112, the time gating circuitry 128 immediately releases the packet to the network interface 112.

In another embodiment, when the time gating circuitry 128 receives timestamping control information (such as described above), and when the timestamping control information indicates that the packet is not to be timestamped, the time gating circuitry 128 immediately releases the packet to the network interface 112.

The plurality of processing stages 120 includes one or more post-timestamping processing stages 140 between the time stamping circuitry 124 and the time gating circuitry 128. In an embodiment, the one or more post-timestamping processing stages 140 includes authentication circuitry that is configured to generate authentication information for contents of the packet, including the timestamp embedded in the packet by the time stamping circuitry 124. In an embodiment, the authentication circuitry is configured to embed the authentication information in the packet. In another embodiment, the authentication circuitry is configured to embed the authentication information in a subsequent packet.

In another embodiment, the one or more post-timestamping processing stages 140 additionally or alternatively includes encryption circuitry that is configured to encrypt contents of the packet, including the timestamp embedded in the packet by the time stamping circuitry 124.

In other embodiments, the one or more post-timestamping processing stages 140 additionally or alternatively includes other suitable circuitry that performs other suitable processing of the packet.

As discussed above, the timestamp embedded in the packet by the time stamping circuitry 124 corresponds to a future time at which the packet is to be transmitted via the network interface 112, and the future time corresponds to a time offset added to a current time at which the packet is received at the time stamping circuitry 124. In an embodiment, the time offset corresponds to a maximum latency of the one or more processing stages 140.

In some embodiments, the plurality of processing stages 120 includes one or more pre-timestamping processing stages 144 prior to the time stamping circuitry 124. In an embodiment, one of the one or more pre-timestamping processing stages 144 includes a DMA circuit that reads packets from the memory 104 and provides the packets to the plurality of processing stages 120.

In some embodiments, the timing information generated by the timestamping circuitry 124 is provided to the time gating circuitry 128 via the one or more processing stages 140. For example, the processing stage(s) 140 include respective circuitry for forwarding the timing information to a next processing stage in the plurality of processing stages 120 so that the timing information is synchronized with the future timestamped packet. In some embodiments, the processing stage(s) 140 include respective registers, buffers, etc., for temporarily storing the timing information.

As another example, the timing information is appended to the future timestamped packet by the timestamping circuitry 124 (as discussed above), and the timing information is passed through the one or more processing stages 140 appended to the future timestamped packet. In an embodiment in which the one or more processing stages 140 includes authentication circuitry- and in which the timing information is appended to the packet, the authentication circuitry is aware that the timing information will not be transmitted with the packet, and the authentication circuitry is configured to generate authentication information for the packet without using the timing information appended to the packet. In an embodiment in which the one or more processing stages 140 includes encryption circuitry and in which the timing information is appended to the packet, the encryption circuitry is aware that the timing information will not be transmitted with the packet, and the encryption circuitry is configured to encrypt contents of the packet without using the timing information appended to the packet.

In other embodiments, the timing information generated by the timestamping circuitry 124 bypasses the one or more processing stages 140 via a path separate from the one or more processing stages 140. In some such embodiments, the time gating circuitry 128 includes memory (e.g., a register, a buffer, etc.) for storing the timing information until the future timestamped packet is received by the time gating circuitry 128; and the time gating circuitry 128 includes circuitry for logically linking the timing information stored in the memory with the future timestamped packet when the future timestamped packet is received by the time gating circuitry 128.

Although one network interface 112 and one communication link 116 is illustrated in FIG. 1, in other embodiments, the network device 100 comprises a plurality of network interfaces 112 coupled to respective communication links 116. In some embodiments in which the network device 100 comprises a plurality of network interfaces 112 coupled to respective communication links 116, the network device 100 includes a respective plurality of processing stages 120 (e.g., each including a time stamping circuit 124 and a time gating circuit 128) for respective ones of the plurality of network interfaces 112.

In some embodiments, the transmit time output by the timestamping circuitry 124 is adjusted with respect to the timestamp embedded in the packet. For example, to account for a known delay (e.g., a fixed, known delay) after the time gating circuitry 128 (e.g., including a fixed, known delay through the network interface 112), the timestamping circuitry 124 adjusts the transmit time output by the timestamping circuitry 124 to be earlier than the timestamp embedded in the packet to account for the known delay, e.g., through the network interface 112.

In other embodiments, the timestamping circuitry 124 does not adjust the transmit time output by the timestamping circuitry 124 with respect to the timestamp embedded in the packet.

Figure 1B:
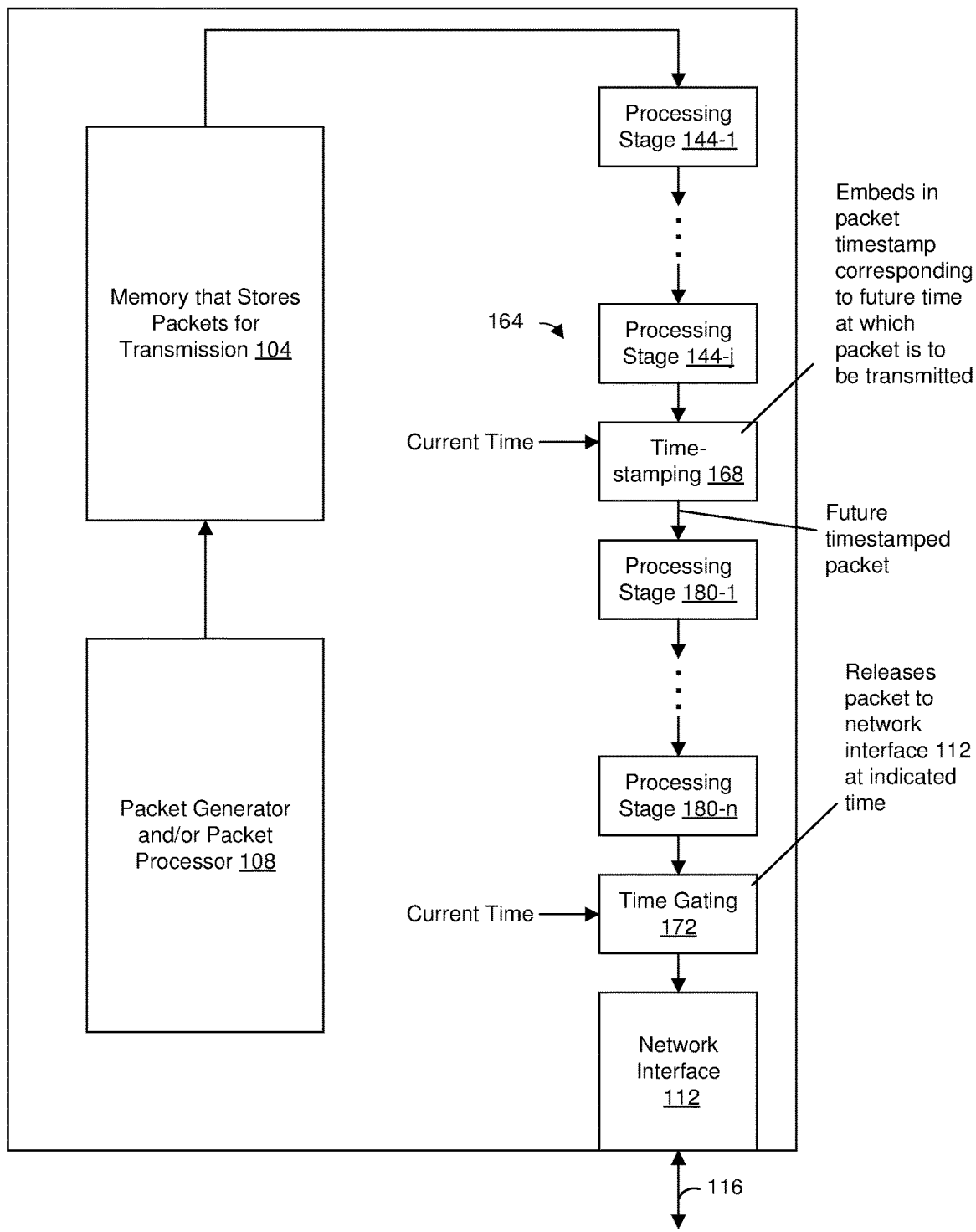
FIG. 1B is a block diagram of another example network device that embeds a future timestamp in a packet and releases the packet for transmission when a current time reaches a transmit time corresponding to the future timestamp, according to another embodiment.

FIG. 1B is a diagram of a simplified diagram of another example network device 160 that transmits timestamped packets in a communication network, according to an embodiment. The network device 160 is similar to the network device 100 of FIG. 1A, and elements with the same reference number are not described in detail for purposes of brevity. The network device 160 includes a plurality of processing stages 164 (similar to the plurality of processing stages 120 of FIG. 1A) that process packets prior to transmission of the packets via the communication link 116.

The plurality of processing stages 164 includes time stamping circuitry 168, which is similar to the timestamping circuitry 124 of FIG. 1A. For instance, the time stamping circuitry 168 is configured to modify a packet to embed a future timestamp in the packet. The future timestamp embedded in the packet by the time stamping circuitry 124 corresponds to a future time at which the packet is to be transmitted via the network interface 112. However, unlike the time stamping circuitry 124 of FIG. 1A, the time stamping circuitry 168 does not output timing information that is separate from the timestamp in the packet. As will be discussed below, time gating circuitry 172 in the plurality of processing stages 164 uses the timestamp in the packet to determine when the packet is to be released to the network interface 112, as will be described below. The time stamping circuitry 168 and the time gating circuitry 172 is useful in embodiments in which the timestamp is not modified and/or obscured (e.g., by encryption circuitry) prior to transmission, and thus the time gating circuitry 172 is able to obtain the timestamp from the packet.

In some situations, the position of the timestamp in the packet may vary from packet to packet because, for example, of variable length fields in packet headers, different packets having different/additional headers, etc. Thus, in some embodiments, the time stamping circuitry 168 provides to the time gating circuitry 172 offset information (not shown) that indicates a position of the timestamp within the packet; and the time gating circuitry 172 uses the offset information to retrieve the timestamp within the packet. In an embodiment, the time stamping circuitry 168 outputs the offset information separately from the packet, e.g., via a first output of the time stamping circuitry 168, which is separate from a second output of the time stamping circuitry 168 that outputs the packet that includes the timestamp. In another embodiment, the timing information is appended to the packet, e.g., in a tag appended to the packet, the tag being removed from the packet prior to transmitting the packet via the network interface 112 so that the tag is not transmitted via the network interface 112.

The plurality of processing stages 164 includes one or more post-timestamping processing stages 180 between the time stamping circuitry 168 and the time gating circuitry 172. The one or more post-timestamping processing stages 180 are similar to the one or more post-timestamping processing stages 140 of FIG. 1A. For example, in an embodiment, the one or more post-timestamping processing stages 180 includes authentication circuitry that is configured to generate authentication information for contents of the packet, including the timestamp embedded in the packet by the time stamping circuitry 168. In another embodiment, the one or more post-timestamping processing stages 180 additionally or alternatively includes encryption circuitry that is configured to encrypt contents of the packet, but not the timestamp embedded in the packet by the time stamping circuitry 168.

In other embodiments, the one or more post-timestamping processing stages 180 additionally or alternatively includes other suitable circuitry that performs other suitable processing of the packet, but that do not modify or obscure the timestamp embedded in the packet by the time stamping circuitry 168.

In some embodiments in which the time stamping circuitry 168 provides offset information (not shown) that indicates a position of the timestamp within the packet, such offset information is provided to the time gating circuitry 172 via the one or more processing stages 180. For example, the processing stage(s) 180 include respective circuitry for forwarding the offset information to a next processing stage in the plurality of processing stages 164 so that the offset information is synchronized with the future timestamped packet. In some embodiments, the processing stage(s) 148 include respective registers, buffers, etc., for temporarily storing the timing information.

As another example, the offset information is appended to the future timestamped packet by the timestamping circuitry 168 (as discussed above), and the offset information is passed through the one or more processing stages 180 appended to the future timestamped packet. In other embodiments, the offset information generated by the timestamping circuitry 168 bypasses the one or more processing stages 180 via a path separate from the one or more processing stages 180. In some such embodiments, the time gating circuitry 172 includes memory (e.g., a register, a buffer, etc.) for storing the offset information until the future timestamped packet is received by the time gating circuitry 172; and the time gating circuitry 172 includes circuitry for logically linking the offset information stored in the memory with the future timestamped packet when the future timestamped packet is received by the time gating circuitry 172.

The time gating circuitry 172 is configured to i) receive the packet that is to be transmitted via the network interface 112, ii) retrieve the timestamp from the packet (which indicates the transmit time for the packet), iii) hold the packet from proceeding to the network interface 112 prior to a current time reaching the transmit tune, and iv) release the packet to the network interface 112 in response to the current time reaching the transmit time, according to an embodiment. Because the time gating circuitry 172 releases the packet to the network interface 112 when the current time reaches the transmit time (which corresponds to the timestamp in the packet), the timestamp in the packet more accurately reflects the actual transmit time of the packet.

In embodiments in which the timestamping circuitry 168 provides offset information that indicates a position of the timestamp within the packet, the gating circuitry 172 is configured to use the offset information to retrieve the timestamp from the packet. In some embodiments in which the timestamping circuitry 168 appends the offset information to the packet, e.g., in a tag appended to the packet, the time gating circuitry 172 is configured to remove the appended offset information from the packet prior to releasing the packet to the network interface 112.

Referring now to FIGS. 1A and 1B, the timestamping and time gating techniques of the network device 100 are more suitable for timestamps that are modified/obscured prior to transmission (e.g., when the timestamps are encrypted), as compared to the network device 160. Additionally, when a timestamp is not embedded close to a beginning of a packet, the timestamping and time gating techniques of the network device 100 may be more suitable as compared to the network device 160. For example, the time gating circuitry 172 may require a larger memory in order to buffer portions of a packet prior to the timestamp. Additionally, the timestamping and time gating techniques of the network device 100 may provide more accurate timestamps as compared to the network device 160 because of delays at the time gating circuit 172 associated with locating and extracting the timestamp from the packet. On the other hand, the timestamping and time gating techniques of the network device 160 may require less complex circuitry as compared to the network device 100, at least when timestamps are embedded close to the beginning of packets at a fixed location within the packets.

Figure 2A:
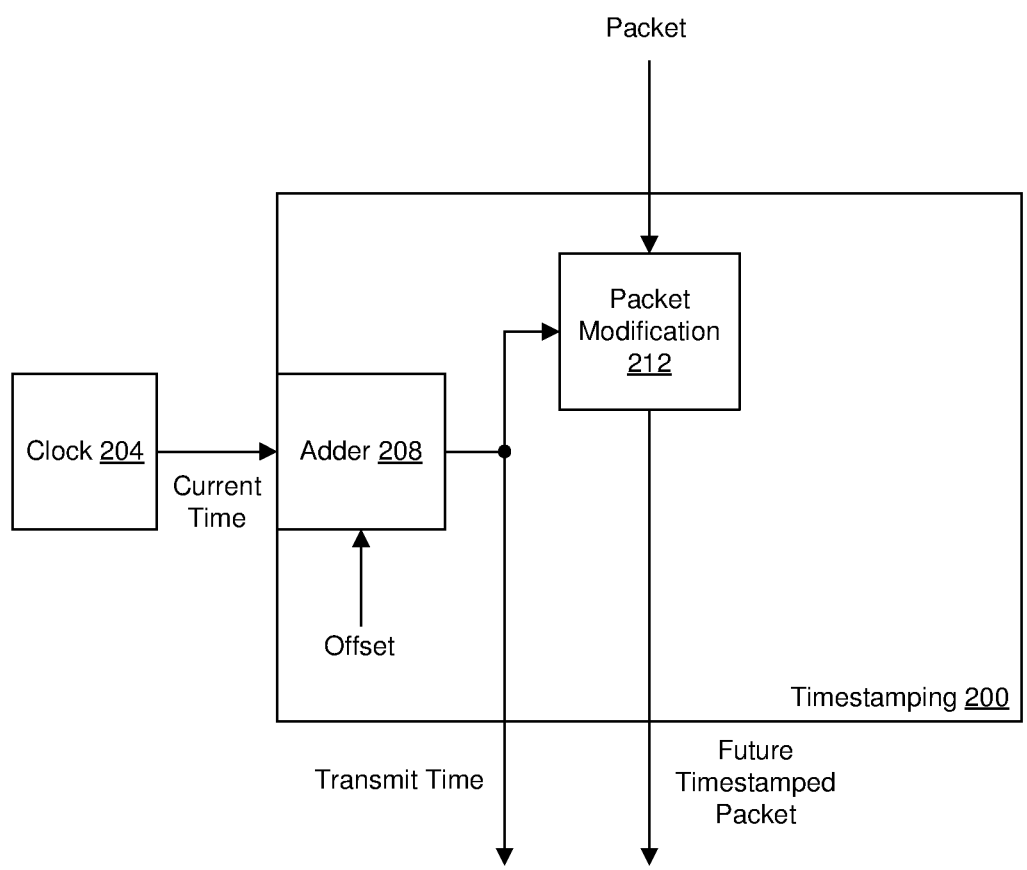
FIG. 2A is a block diagram of example timestamping circuitry of the network device of FIG. 1A, the example timestamping circuitry configured to embed a future timestamp in a packet and to output timing information, separate from the timestamp, that indicates a transmit time corresponding to the timestamp, according to an embodiment.

FIG. 2A is a diagram of example timestamping circuitry 200 for adding a timestamp to a packet, the timestamp corresponding to a future time at which the packet is to be transmitted, according to an embodiment. The timestamping circuitry 200 is included in the timestamping circuitry 124 of FIG. 1A, according to an embodiment. In other embodiments, the timestamping circuitry 200 is included in another suitable network device other than the network device 100 of FIG. 1.

The timestamping circuitry 200 is coupled to, or includes, a clock circuit 204, and receives a current time value generated by the clock circuit 204. The timestamping circuitry 200 also includes an adder circuit 208 that is configured to add a time offset to the current time from the clock circuit 204 to generate a future time value corresponding to a time at which the packet is to be transmitted (e.g., a transmit time). The time offset corresponds to a maximum latency of one or more processing stages in a plurality of processing stages that are to process the packet after the time stamping circuitry 200. In embodiments in which the time stamping circuitry 200 is used in the network device 100, the time offset corresponds to a maximum latency of the one or more processing stages 140. In an embodiment in which authentication circuitry is to generate authentication information for the packet after the time stamping circuitry 200 has added a timestamp to the packet, the time offset accounts for at least a maximum latency of the authentication circuitry. In an embodiment in which encryption circuitry is to encrypt contents of the packet after the time stamping circuitry 200 has added a timestamp to the packet, the time offset accounts for at least a maximum latency of the encryption circuitry.

The timestamping circuitry 200 also includes a packet modification circuit 212 that is configured to modify the packet to include (or embed) in the packet a timestamp corresponding to the transmit time generated by the adder 208.

The timestamping circuitry 200 outputs i) the packet that includes the timestamp (sometimes referred to herein as a "timestamped packet"), and ii) timing information. In an embodiment, the time stamping circuitry 200 outputs the timing information separately from the timestamped packet, e.g., via a first output of the time stamping circuitry 200, which is separate from a second output of the time stamping circuitry 200 that outputs the timestamped packet. In another embodiment, the timestamping circuitry 200 includes circuitry (not shown) that is configured to append the timing information to the packet, e.g., in a tag appended to the packet, where the tag will be removed from the packet prior to transmitting the packet via the network interface 112 so that the tag is not transmitted via the network interface 112.

In some embodiments in which the timestamping circuitry 124 appends the timing information to the packet, e.g., in a tag appended to the packet, the time gating circuitry 128 is configured to remove the appended timing information from the packet prior to releasing the packet to the network interface 112.

In some embodiments, the time stamping circuitry 200 does not timestamp every packet that the time stamping circuitry 200 receives, e.g., the time stamping circuitry 200 selectively timestamps packets. For example, the packet generator/packet processor 108 determines which packets are to be timestamped and informs the time stamping circuitry 200 of which packets are to be timestamped, according to an embodiment. Thus, in some embodiments, the time stamping circuitry 200 includes control circuitry (not shown) that receives timestamping control information corresponding to a packet and that indicates whether the packet is to be timestamped, and the control circuitry controls the time stamping circuitry 200 to selectively add a timestamp to the packet based on the timestamping control information. For example, when the timestamping control information indicates that the packet is to be timestamped, the control circuitry controls the time stamping circuitry 200 to include a timestamp in the packet as discussed above; on the other hand, when the timestamping control information indicates that the packet is not to be timestamped, the control circuitry controls the time stamping circuitry 200 to not include a timestamp in the packet.

In an embodiment, the time stamping circuitry 200 receives the timestamping control information (e.g., from the packet generator/packet processor 108) separate from the packet but corresponding to the packet. In another embodiment, the timestamping control information (e.g., from the packet generator/packet processor 108) is appended to the packet, e.g., in a tag appended to the packet. In an embodiment in which the packet received by the tune stamping circuitry 200 includes a tag that indicates the packet is to be timestamped, the time stamping circuitry 200 modifies the tag to include the transmit time in the tag. In another embodiment in which the packet received by the time stamping circuitry 200 includes a tag that indicates the packet is to be timestamped, the time stamping circuitry 200 adds an additional tag to the packet, the additional tag including the transmit time. In another embodiment in which the packet received by the time stamping circuitry 200 includes a tag that indicates the packet is to be timestamped, the time stamping circuitry 200 removes the tag and adds a new tag to the packet, the new tag including the transmit time.

In an embodiment, when the timestamping control information indicates that the packet is not to be timestamped, the control circuitry (not shown) of the time stamping circuitry 200 sets the timing information to value so that the time gating circuitry 128 immediately releases the packet to the network interface 112. For example, when the timestamping control information indicates that the packet is not to be timestamped, the control circuitry (not shown) of the time stamping circuitry 200 sets the timing information to indicate the current time or a past time, according to an embodiment. In another embodiment, when the timestamping control information indicates that the packet is not to be timestamped, the control circuitry (not shown) of the time stamping circuitry 200 sets the timing information to a predetermined value that indicates to the time gating circuitry 128 that the time gating circuitry 128 should immediately release the packet to the network interface 112.

In another embodiment, the timestamping control information is also provided to the time gating circuitry 128, and when the timestamping control information indicates that the packet is not to be timestamped, the time gating circuitry 128 immediately releases the packet to the network interface 112.

In some embodiments, the transmit tune output by the timestamping circuitry 200 is adjusted with respect to the timestamp embedded in the packet. For example, to account for a known delay (e.g., a fixed, known delay) after the time gating circuitry 128 (e.g., including a fixed, known delay through the network interface 112), the timestamping circuitry 200 adjusts the transmit time output by the timestamping circuitry 200 to be earlier than the timestamp embedded in the packet to account for the known delay, e.g., through the network interface 112.

In other embodiments, the timestamping circuitry 200 does not adjust the transmit time output by the timestamping circuitry 200 with respect to the timestamp embedded in the packet.

Figure 2B:
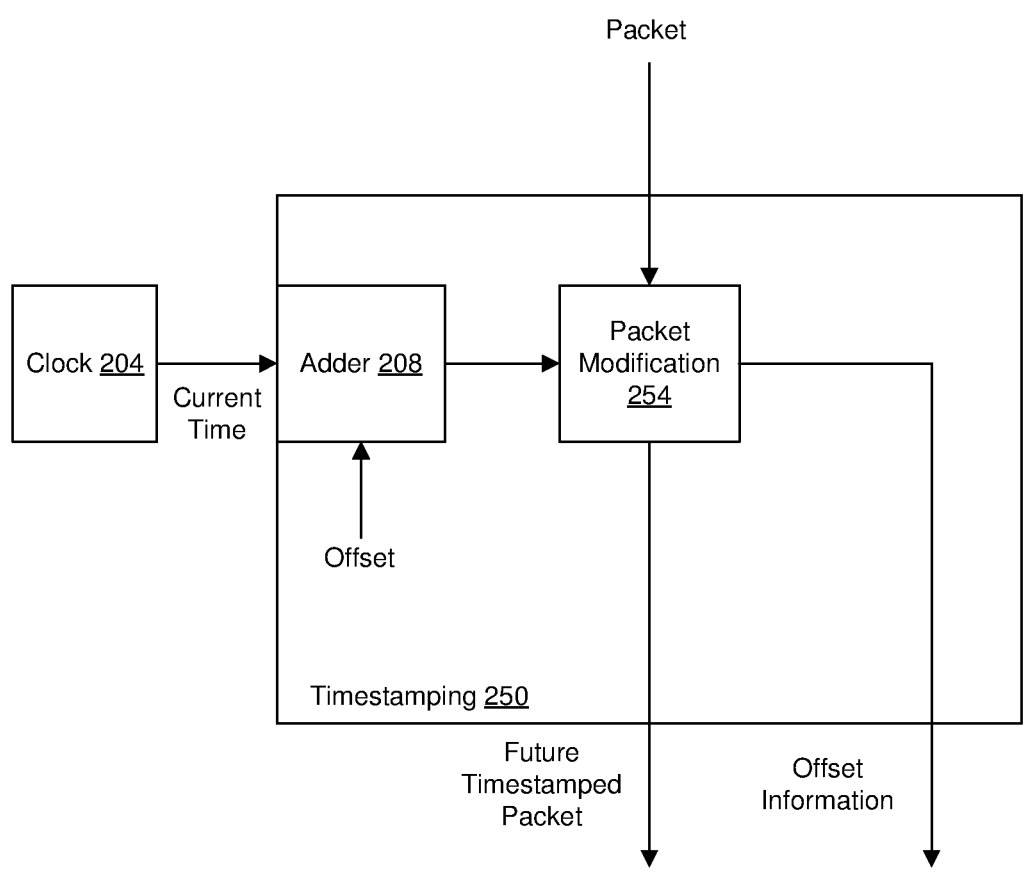
FIG. 2B is a block diagram of example timestamping circuitry of the network device of FIG. 1B, the example timestamping circuitry configured to embed a future timestamp in a packet, according to another embodiment.

FIG. 2B is a diagram of another example timestamping circuitry 250 for adding a timestamp to a packet, the timestamp corresponding to a future time at which the packet is to be transmitted, according to an embodiment. The timestamping circuitry 250 is included in the timestamping circuitry 168 of FIG. 1B, according to an embodiment. In other embodiments, the timestamping circuitry 250 is included in another suitable network device other than the network device 160 of FIG. 1B. The timestamping circuitry 250 is similar to the timestamping circuitry 200 of FIG. 2A, and elements with the same reference number are not described in detail for purposes of brevity.

Unlike the timestamping circuitry 200 of FIG. 2A, the timestamping circuitry 250 does not output timing information, separate from the timestamp in the packet, that indicates a future transmit time for the packet.

The timestamping circuitry 250 includes a packet modification circuit 254 that is configured to modify the packet to include (or embed) in the packet a timestamp corresponding to the transmit time generated by the adder 208. In some embodiments, the packet modification circuit 254 also outputs offset information that that indicates a position of the timestamp that the packet modification circuit 254 included or embedded in the packet.

In some embodiments, the timestamping circuitry 250 outputs the offset information that indicates a position of the timestamp within the packet. In an embodiment, the time stamping circuitry 250 outputs the offset information separately from the timestamped packet, e.g., via a first output of the time stamping circuitry 250, which is separate from a second output of the time stamping circuitry 250 that outputs the timestamped packet. In another embodiment, the timestamping circuitry 250 includes circuitry (not shown) that is configured to append the offset information to the packet, e.g., in a tag appended to the packet, where the tag will be removed from the packet prior to transmitting the packet via the network interface 112 so that the tag is not transmitted via the network interface 112.

In some embodiments in which the timestamping circuitry 254 appends the offset information to the packet, e.g., in a tag appended to the packet, the time gating circuitry 172 is configured to remove the appended offset information from the packet prior to releasing the packet to the network interface 112.

In other embodiments (such as in embodiments in which the timestamp is added at a fixed position within all timestamped packets), the timestamping circuitry 250 does not output the offset information that indicates a position of the timestamp within the packet and/or does not provide the offset information to the time gating circuitry 172.

Figure 3A:
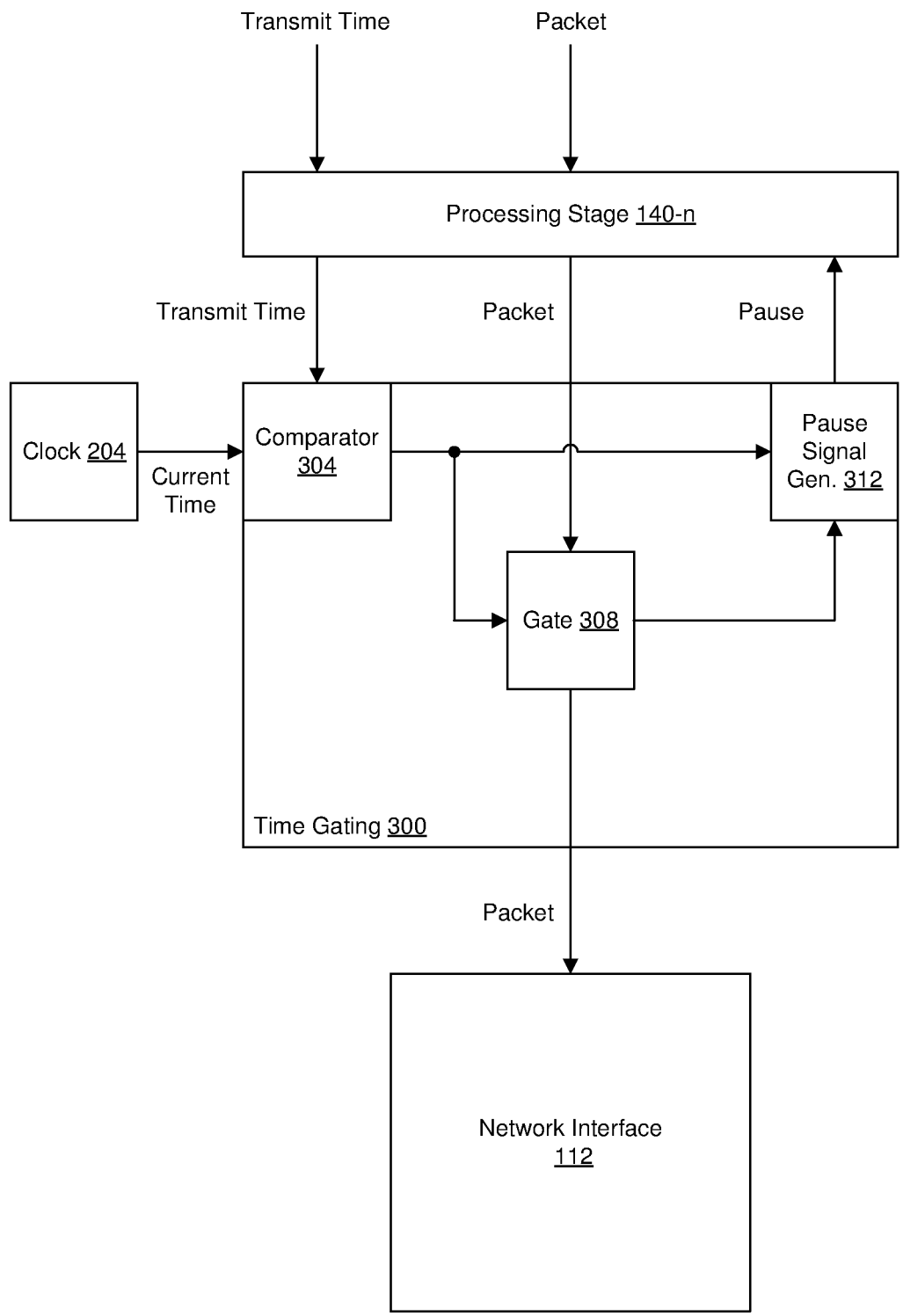
FIG. 3A is a block diagram of example time gating circuitry of the network device of FIG. 1A, the example time gating circuitry configured to release a packet for transmission when a current time has reached a transmit time corresponding to a timestamp in the packet, according to an embodiment.

FIG. 3A is a diagram of example time gating circuitry 300 for selectively releasing a packet to a network interface for transmission, according to an embodiment. The time gating circuitry 300 is included in the time gating circuitry 128 of FIG. 1, according to an embodiment. In other embodiments, the time gating circuitry 300 is included in another suitable network device other than the network device 100 of FIG. 1.

The time gating circuitry 300 is coupled to, or includes, the clock circuit 204 (FIG. 2A), and receives a current time value generated by the clock circuit 204. In another embodiment, the time gating circuitry 300 is coupled to, or includes, another clock circuit separate from the clock circuit 204 (FIG. 2A) and synchronized to the clock circuit 204, and receives a current time value generated by the other clock circuit.

The time gating circuitry 300 receives a packet from the processing stage 140-*n* (FIG. 1A). The time gating circuitry 300 also receives the timing information (transmit time) indicating the time at which the packet is to be released to the network interface 112. The time gating circuitry 300 includes a comparator circuit 304 that receives the timing information (transmit time) and the current time and compares the current time to the transmit time. The comparator circuit 304 is configured to generate a control signal that indicates whether the current time has reached the transmit time and/or whether the time gating circuitry 300 is to release the packet to the network interface 112.

In an embodiment in which the time stamping circuitry 124/200 is configured to set the timing information (transmit time) to a predetermined value to indicate when a packet has not been timestamped, the comparator circuit 304 is configured to generate the control signal when the timing information (transmit time) is set to the predetermined value to indicate that the time gating circuitry 300 is to release the packet to the network interface 112. In an embodiment in which the time stamping circuitry 124/200 sets the timing information (transmit time) to the current/past time for a packet that has not been timestamped, the comparator circuit 304 will determine that the current time has already reached the transmit time and will thus generate the control signal to indicate that the time gating circuitry 300 is to release the packet to the network interface 112.

The time gating circuitry 300 also includes a gate circuit 308. The gate circuit 308 is configured to selectively release the packet to the network interface 112 based on whether the current time has reached the transmit time for the packet. For example, in an embodiment, the gate circuit 308 is configured to selectively release the packet to the network interface 112 based on the control signal generated by the comparator circuit 304. In an embodiment, the gate circuit 308 is configured to i) hold the packet from proceeding to the network interface 112 prior to the current time reaching the transmit time, and ii) release the packet to the network interface 112 in response to the current time reaching the transmit time.

In an embodiment, the gate circuit 308 includes a memory device (not shown) for storing at least a portion of the packet received from the processing stage 140-*n* (FIG. 1A). For example, the memory device (not shown) stores a portion of the packet while the packet is being held from proceeding to the network interface 112. As another example, the memory device (not shown) stores a portion and the gate circuit 308 reads the portion of the packet from the memory device in response to determining that the packet is to be released to the network interface 112. In an embodiment, the memory device of the gate circuit 308 comprises a buffer, a register, etc.

In an embodiment, the time gating circuitry 300 also includes a pause signal generator circuit 312 that is configured to selectively generate a pause signal for the processing stage 140-*n*. In an embodiment, the pause signal prompts the processing stage 140-*n* to stop providing packet data to the time gating circuitry 300. The pause signal generator circuit 312 is configured to selectively generate the pause signal based on whether the current time has reached the transmit time for the packet. For example, in an embodiment, the pause signal generator circuit 312 is configured to selectively generate the pause signal based on the control signal generated by the comparator circuit 304.

In an embodiment, the gate circuit 308 is configured to generate an additional control signal that indicates that the gate circuit 308 is not ready to receive additional packet data while the packet is being released to the network interface 112 because, for example, the gate circuit 308 has not completed reading data stored in the memory device of the gate circuit 308. The pause signal generator circuit 312 is configured to selectively generate the pause signal further based on the additional control signal generated by the gate circuit 308.

In operation, the time gating circuitry 300 i) receives the packet that is to be transmitted via the network interface 112, ii) receives the timing information (which indicates the transmit time for the packet) from the time stamping circuitry 124/200, holds the packet from proceeding to the network interface 112 prior to a current time reaching the transmit time, and iv) releases the packet to the network interface 112 in response to the current time reaching the transmit time, according to an embodiment. Because the time gating circuitry 300 releases the packet to the network interface 112 when the current time reaches the transmit time (which corresponds to the timestamp in the packet), the timestamp in the packet more accurately reflects the actual transmit time of the packet.

In some embodiments in which the timestamping circuitry 124/200 appends the timing information to the packet, e.g., in a tag appended to the packet, the time gating circuitry 300 includes tag removal circuitry (not shown) that is configured to remove the appended timing information from the packet prior to releasing the packet to the network interface 112.

In another embodiment in which the time gating circuitry 300 also receives timestamping control information (such as described above), and when the timestamping control information indicates that the packet is not to be timestamped, control circuitry (not shown) of the time gating circuitry 300 generates a control signal that causes the gate circuit 308 to immediately release the packet to the network interface 112.

In some embodiments, the time gating circuitry 300 adjusts the transmit time received by the time gating circuitry 300 with respect to the timestamp embedded in the packet. For example, to account for a known delay (e.g., a fixed, known delay) after the time gating circuitry 300 (e.g., including a fixed, known delay through the network interface 112), the time gating circuitry 300 adjusts the transmit time received by the time gating circuitry 300 to be earlier than the timestamp embedded in the packet to account for the known delay, e.g., through the network interface 112.

In other embodiments, the time gating circuitry 300 does not adjust the transmit time received by the time gating circuitry 300 with respect to the timestamp embedded in the packet.

Figure 3B:
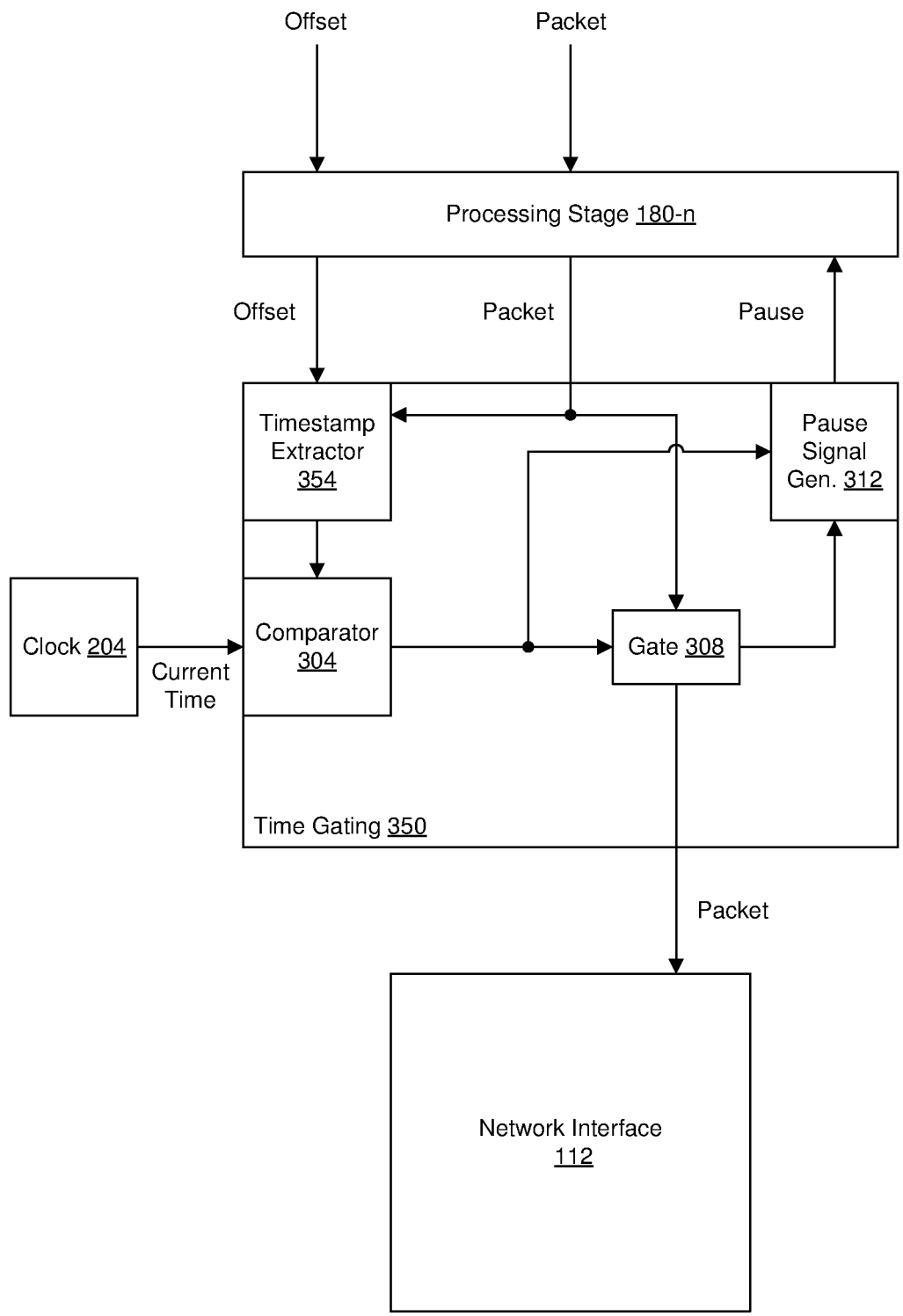
FIG. 3B is a block diagram of example time gating circuitry of the network device of FIG. 1B, the example time gating circuitry configured to extract a timestamp from a packet to determine a transmit time of the packet, and to release the packet for transmission when a current time has reached the transmit time, according to another embodiment.

FIG. 3B is a diagram of another example time gating circuitry 350 for selectively releasing a packet to a network interface for transmission, according to an embodiment. The time gating circuitry 350 is included in the time gating circuitry 172 of FIG. 1B, according to an embodiment. In other embodiments, the time gating circuitry 350 is included in another suitable network device other than the network device 160 of FIG. 1B. The time gating circuitry 350 is similar to the time gating circuitry 300 of FIG. 3A, and elements with the same reference number are not described in detail for purposes of brevity.

Unlike the time gating circuitry 300 of FIG. 3A, the time gating circuitry 350 does not receive timing information, separate from the timestamp in the packet, that indicates a future transmit time for the packet. Rather, the time gating circuitry 350 retrieves the timestamp from the packet to determine the future transmit time for the packet.

The time gating circuitry 300 includes a timestamp extractor 354 that extracts the timestamp from the packet and provides a transmit time corresponding to the timestamp to the comparator 304. In embodiments in which the timestamping circuitry 268/250 provides offset information that indicates a position of the timestamp within the packet, the timestamp extractor 354 uses the offset information to determine a position of the timestamp within the packet, and then extracts the timestamp at the determined position from the packet.

In some embodiments, the time gating circuitry 350 adjusts the transmit time provided to the comparator 304. For example, to account for a known delay (e.g., a fixed, known delay) after the time gating circuitry 350 (e.g., including a fixed, known delay through the network interface 112), the time gating circuitry 350 adjusts the transmit time provided to the comparator 304 to be earlier than the timestamp embedded in the packet to account for the known delay, e.g., through the network interface 112.

In other embodiments, the time gating circuitry 350 does not adjust the transmit time provided to the comparator 304 with respect to the timestamp embedded in the packet.

Figure 4:
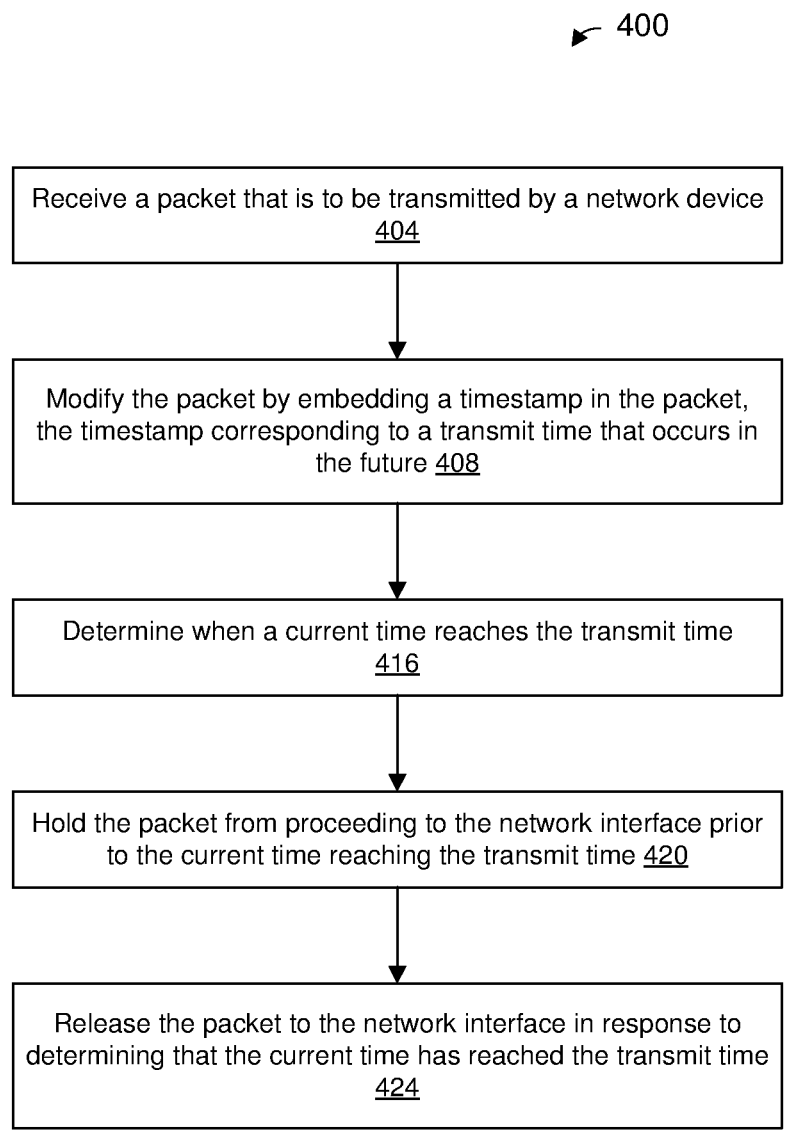
FIG. 4 is a flow diagram of an example method for transmitting a packet, the example method including embedding a timestamp in a packet and releasing the packet for transmission when a current time reaches a transmit time corresponding to the timestamp, according to an embodiment.

FIG. 4 is a flow diagram of an example method 400 for transmitting packets, according to an embodiment. The method 400 is implemented by the network device 100 of FIG. 1A or the network device 160 of FIG. 1B, in some embodiments, and the method 400 is described with reference to FIGS. 1A and 1B for ease of explanation. In other embodiments, the method 400 is implemented by another suitable network device different than the network devices 100 and 160 of FIGS. 1A and 1B. Similarly, a portion of the method 400 is implemented by the timestamping circuitry 200 of FIG. 2A or the timestamping circuitry 250 of FIG. 2B, in some embodiments, and the method 400 is described with reference to FIGS. 2A and 2B for ease of explanation. In other embodiments, the method 400 is implemented using other suitable timestamping circuitry different than the timestamping circuitry 200 or 250 of FIGS. 2A and 2B. Similarly, a portion of the method 400 is implemented by the time gating circuitry 300 of FIG. 3A or the time gating circuitry 350 of FIG. 3B, in some embodiments, and the method 400 is described with reference to FIGS. 3A and 3B for ease of explanation. In other embodiments, the method 400 is implemented using other suitable time gating circuitry different than the time gating circuitry 300 or 350 of FIGS. 3A and 3B.

At block 404, timestamping circuitry of a network device receives a packet that is to be transmitted via a network interface of the network device. For example, the timestamping circuitry 124 (FIG. 1A) receives a packet that is to be transmitted via the network interface 112, according to an embodiment. As another example, the timestamping circuitry 168 (FIG. 1B) receives a packet that is to be transmitted via the network interface 112, according to an embodiment. As yet another example, the timestamping circuitry 200 (FIG. 2A) receives a packet that is to be transmitted via a network interface, according to another embodiment. As still another example, the timestamping circuitry 250 (FIG. 2B) receives a packet that is to be transmitted via a network interface, according to another embodiment.

At block 408, the timestamping circuitry modifies the packet by embedding a timestamp in the packet. The timestamp corresponding to a transmit time at which the packet is to be transmitted by the network interface, where the transmit time occurs after the timestamping circuitry embeds the timestamp in the packet. For example, the timestamping circuitry 124 (FIG. 1A) embeds a timestamp in a packet that is to be transmitted via the network interface 112, according to an embodiment. As another example, the timestamping circuitry 168 (FIG. 1B) embeds a timestamp in a packet that is to be transmitted via the network interface 112, according to an embodiment. As yet another example, the timestamping circuitry 200 (FIG. 2A) embeds a timestamp in a packet that is to be transmitted via a network interface, according to another embodiment. As still another example, the timestamping circuitry 250 (FIG. 2B) embeds a timestamp in a packet that is to be transmitted via a network interface, according to another embodiment.

In some embodiments, the network device generates timing information, separate from the timestamp in the packet, that indicates the transmit time corresponding to the timestamp in the packet. For example, the timestamping circuitry 124 (FIG. 1A) generates the timing information, according to an embodiment. As another example, the timestamping circuitry 200 (FIG. 2A) generates the timing information, according to another embodiment.

In some embodiments, the network device generates offset information that indicates a position of the timestamp within the packet. For example, the timestamping circuitry 168 (FIG. 1B) generates the offset information, according to an embodiment. As another example, the timestamping circuitry 250 (FIG. 2B) generates the offset information, according to another embodiment.

At block 416, the network device determines when a current time reaches the transmit time. In an embodiment, the current time is generated by a clock circuit of the network device. For example, the time gating circuitry 128 (FIG. 1A) receives the timing information that indicates the transmit time, and determines when the current time reaches the transmit time, according to an embodiment. As another example, the time gating circuitry 172 (FIG. 1B) receives the timing information that indicates the transmit time, and determines when the current time reaches the transmit time, according to an embodiment. As yet another example, the time gating circuitry 300 (FIG. 3A) receives the timing information that indicates the transmit time, and determines when the current time reaches the transmit time, according to another embodiment. For instance, the comparator circuit 304 (FIG. 3A) receives i) the current time, and ii) the timing information that indicates the transmit time, and the comparator circuit 304 determines when the current time reaches the transmit time, according to another embodiment.

In an embodiment, the timing information that indicates the transmit time is received by the time gating circuitry separate from the packet. In another embodiment, the timing information is appended to the packet, e.g., in a tag appended to the packet, and the time gating circuitry thus receives the timing information together with the packet.

As still another example, the time gating circuitry 350 (FIG. 3B) retrieves the timestamp from the packet, determines the transmit time using the timestamp, and determines when the current time reaches the transmit time, according to another embodiment. In an embodiment, the method also comprises receiving offset information that indicates a position of the timestamp within the packet, and the time gating circuitry 350 (FIG. 3B) uses the offset information to retrieve the timestamp from the packet.

In other embodiments, the transmit time is determined by extracting the timestamp from the packet. For example, the time gating circuitry 172 (FIG. 1B) extracts the timestamp from the packet to determine the transmit time, and determines when the current time reaches the transmit time, according to an embodiment. As another example, the time gating circuitry 350 (FIG. 3B) extracts the timestamp from the packet to determine the transmit time, and determines when the current time reaches the transmit time, according to another embodiment. As another example, the timestamp extractor circuit 354 (FIG. 3B) extracts the timestamp from the packet and provides the transmit time to the comparator circuit 304; and the comparator circuit 340 receives i) the current time, and ii) the transmit time, and the comparator circuit 304 determines when the current time reaches the transmit time, according to another embodiment. In some embodiments, the timestamp extractor circuit 354 (FIG. 3B) uses offset information to determine a position of the timestamp within the packet, and extracts the timestamp from the determined location within the packet.

At block 420, time gating circuitry of the network device holds the packet from proceeding to the network interface prior to the current time reaching the transmit time. For example, the time gating circuitry 128 (FIG. 1A) holds the packet from proceeding to the network interface prior to the current time reaching the transmit time, according to an embodiment. As another example, the time gating circuitry 172 (FIG. 1B) holds the packet from proceeding to the network interface prior to the current time reaching the transmit time, according to an embodiment. As yet another example, the time gating circuitry 300 (FIG. 3A) holds the packet from proceeding to the network interface prior to the current time reaching the transmit time, according to another embodiment. For instance, the gating circuit 308 (FIG. 3A) holds the packet from proceeding to the network interface prior to the current time reaching the transmit time, according to an embodiment. As still another example, the time gating circuitry 350 (FIG. 3B) holds the packet from proceeding to the network interface prior to the current time reaching the transmit time, according to another embodiment.

At block 424, the time gating circuitry of the network device releases the packet to the network interface response to determining that the current time has reached the transmit time. For example, the time gating circuitry 128 (FIG. 1A) releases the packet to the network interface in response to the time gating circuitry 128 determining that the current time has reached the transmit time, according to an embodiment. As another example, the time gating circuitry 172 (FIG. 1B) releases the packet to the network interface in response to the time gating circuitry 128 determining that the current time has reached the transmit time, according to an embodiment. As yet another example, the time gating circuitry 300 (FIG. 3A) releases the packet to the network interface in response to the time gating circuitry 300 determining that the current time has reached the transmit time, according to another embodiment. For instance, the gating circuit 308 (FIG. 3A) releases the packet to the network interface in response to the comparator circuit 304 determining that the current time has reached the transmit time, according to an embodiment. As still another example, the time gating circuitry 350 (FIG. 3B) releases the packet to the network interface in response to the time gating circuitry 350 determining that the current time has reached the transmit time, according to another embodiment.

In an embodiment, the method 400 further includes processing the packet, by one or more circuitry stages, after modifying the packet to embed the timestamp in the packet at block 408; and the transmit time is equal to or exceeds a sum of i) a time at which the timestamp is embedded in the packet and ii) an assumed maximum processing time of the one or more circuitry stages that process the packet after modifying the packet to embed the timestamp in the packet.

In an embodiment, processing the packet, by one or more circuitry stages, after modifying the packet to embed the timestamp includes generating authentication information using contents of the packet, including the timestamp embedded in the packet. In an embodiment, processing the packet, by one or more circuitry stages, after modifying the packet to embed the timestamp further includes embedding the authentication information in the packet.

In another embodiment, processing the packet, by one or more circuitry stages, after modifying the packet includes encrypting contents of the packet, including the timestamp embedded in the packet.

Although FIGS. 1A-4 were described with reference to circuitry and/or circuits configured to perform various functions, in various other embodiments, one of, or any suitable combination of two or more of the functions are performed by a processor (e.g., an embedded processor) executing machine readable instructions stored in a memory device such as a RAM, a read only memory (ROM), a Flash memory, etc. Accordingly, at least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as RAM, a ROM, a flash memory, etc. The software or firmware instructions may include machine readable instructions that, when executed by one or more processors, cause the one or more processors to perform various acts.

Embodiment 1

A network device, comprising: a network interface configured to transmit packets via a network link; timestamp circuitry configured to modify a packet that is to be transmitted by the network interface circuitry by embedding a future timestamp in the packet, the future timestamp corresponding to a transmit time at which the packet is to be transmitted by the network interface circuitry, the transmit time occurring after the timestamp circuitry embeds the timestamp in the packet; and time gating circuitry that includes, or is coupled to, a clock circuit, the time gating circuitry configured to i) receive the packet, ii) determine when a current time indicated by the clock circuit reaches the transmit time, iii) hold the packet from proceeding to the network interface circuitry prior to the current time reaching the transmit time, and iv) release the packet in response to the current time reaching the transmit time.

Embodiment 2

The network device of embodiment 1, further comprising: one or more circuitry stages configured to process the packet, the one or more circuitry stages disposed between the timestamp circuitry and the time gating circuitry; wherein the timestamp circuitry is configured to embed in the packet a future timestamp that corresponds to a transmit time that is equal to or exceeds a sum of i) a time at which the future timestamp is embedded in the packet and ii) an assumed maximum processing time of the one or more circuitry stages configured to process the packet between the timestamp circuitry and the time gating circuitry.

Embodiment 3

The network device of embodiment 2, wherein the one or more circuitry stages configured to process the packet between the timestamp circuitry and the time gating circuitry comprises: authentication information generation circuitry that is configured to generate authentication information using contents of the packet, including the timestamp embedded in the packet.

Embodiment 4

The network device of embodiment 3, wherein the authentication information generation circuitry is further configured to embed the authentication information in the packet.

Embodiment 5

The network device of any of embodiments 1-4, wherein: the timestamp circuitry is configured to generate timing information, separate from the timestamp in the packet, that indicates the transmit time; and the time gating circuitry configured to receive the timing information.

Embodiment 6

The network device of embodiment 5, further comprising: one or more circuitry stages disposed between the timestamp circuitry and the time gating circuitry-, the one or more circuitry stages configured to: process the packet, receive the timing information from the timestamp circuitry, and provide the timing information to the time gating circuitry.

Embodiment 7

The network device of embodiment 6, wherein the one or more circuitry stages disposed between the timestamp circuitry and the time gating circuitry comprises: encryption circuitry that is configured to encrypt contents of the packet, including the timestamp embedded in the packet.

Embodiment 8

The network device of either of embodiments 5 or 6, wherein: the timestamp circuitry is configured to provide timing information to the time gating circuitry so that the timing information bypasses the one or more circuitry stages disposed between the timestamp circuitry and the time gating circuitry.

Embodiment 9

The network device of either of embodiments 5 or 6, wherein: the timestamp circuitry is configured to append the timing information to the packet; and the time gating circuitry is configured to remove the timing information appended to the packet prior to releasing the packet to the network interface.

Embodiment 10

The network device of any of embodiments 1-9, wherein the timestamp circuitry includes an adder circuit configured to generate the timestamp at least by adding a time offset to a time indicated by the clock circuit.

Embodiment 11

The network device of any of embodiments 1-9, wherein the time gating circuitry includes a comparator circuit configured to i) compare the current time to the transmit time, and ii) generate a control signal that indicates when the current time has reached the transmit time.

Embodiment 12

The network device of embodiment 11, wherein the time gating circuitry further includes a gate circuit that is configured to i) receive the control signal, and ii) selectively release the packet to the network interface based on the control signal.

Embodiment 13

The network device of any of embodiments 1-12, further comprising: a circuitry stage coupled to the time gating circuitry, the circuitry stage configured to process contents of the packet prior the time gating circuitry receiving the contents of the packet; wherein the time gating circuitry includes a pause signal generator circuit configure to generate a pause signal that causes the circuitry stage to pause sending packet data to the time gating circuitry, the pause signal generator circuit configured to generate the pause signal in response to determining that the current time has not reached the transmit time.

Embodiment 14

A method for transmitting packets, the method comprising: receiving, at a network device, a packet that is to be transmitted via a network interface of the network device; modifying, with timestamping circuitry, the packet by embedding a timestamp in the packet, the timestamp corresponding to a transmit time at which the packet is to be transmitted by the network interface, the transmit time occurring after the timestamping circuitry embeds the timestamp in the packet; determining, at the network device, when a current time reaches the transmit time, the current time generated by a clock circuit of the network device; holding, at time gating circuitry of the network device, the packet from proceeding to the network interface prior to the current time reaching the transmit time; and releasing, by the time gating circuitry, the packet to the network interface in response to that the current time has reached the transmit time.

Embodiment 15

The method of embodiment 14, further comprising: processing, at the network device, contents of the packet with one or more circuitry stages after embedding the timestamp in the packet; wherein modifying the packet comprises embedding in the packet a timestamp that corresponds to a transmit time that is equal to or exceeds a sum of i) a time at which the timestamp is embedded in the packet and ii) an assumed maximum processing time of the one or more circuitry stages.

Embodiment 16

The method of embodiment 15, wherein: processing the contents of the packet with the one or more circuitry stages comprises generating, by the one or more circuitry stages, authentication information using contents of the packet, including the timestamp embedded in the packet.

Embodiment 17

The method of embodiment 16, wherein: processing the contents of the packet with the one or more circuitry stages further comprises embedding, by authentication circuitry, the authentication information in the packet.

Embodiment 18

The method of any of embodiments 14-17, further comprising: generating, at the network device, timing information, separate from the timestamp in the packet, that indicates the transmit time.

Embodiment 19

The method of embodiment 18, further comprising: processing, at the network device, contents of the packet with one or more circuitry stages after embedding the timestamp in the packet; providing, at the network device, the timing information to the time gating circuitry via the one or more circuitry stages that process the contents of the packet after the timestamp is embedded in the packet.

Embodiment 20

The method of embodiment 19, wherein: processing the contents of the packet with the one or more circuitry stages comprises encrypting, by encryption circuitry, contents of the packet, including the timestamp embedded in the packet.

Embodiment 21

The method of any of embodiments 14-20, further comprising: appending, by the timestamp circuitry, the timing information to the packet; and removing, by the time gating circuitry, the timing information appended to the packet prior to releasing the packet to the network interface.

Embodiment 22

The method of any of embodiments 14-21, further comprising: adding, by an adder circuit, a time offset to a time indicated by the clock circuit to generate the timestamp.

Embodiment 23

The method of any of embodiments 14-22, further comprising: comparing, by a comparator circuit, the current time to the transmit time; and generating, by the comparator circuit, a control signal that indicates when the current time has reached the transmit time.

Embodiment 24

The method of embodiment 23, further comprising: receiving, at a gate circuit, the control signal; and selectively releasing, by the gate circuit, the packet to the network interface based on the control signal.

Embodiment 25

The method of any of embodiments 14-24, further comprising: processing, by a circuitry stage, contents of the packet prior the time gating circuitry receiving the contents of the packet; generating, by the time gating circuitry, a pause signal to cause the circuitry stage to pause sending contents of the packet to the time gating circuitry, the pause signal generated in response to determining that the current time has not reached the transmit time.

When implemented in hardware, the hardware may comprise one or more of discrete components, an integrated circuit, an application-specific integrated circuit (ASIC), a programmable logic device (PLD), a system on a chip (SoC) device, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
a network interface configured to transmit packets via a network link that is external to the network device;
timestamp circuitry configured to modify a packet that is to be transmitted by the network interface by embedding a future timestamp in the packet to generate a timestamped packet that is formatted for transmission with the embedded future timestamp via the network link that is external to the network device, the future timestamp associated with a transmit time at which the timestamped packet is to be transmitted by the network interface, the transmit time occurring after the timestamp circuitry embeds the future timestamp in the packet, the timestamp circuitry further configured to generate timing information that is outside of the timestamped packet and that includes the transmit time;

one or more circuitry stages configured to i) receive the timestamped packet, and ii) synchronize passage of the timestamped packet through the one or more circuitry stages with passage of the timing information through the one or more circuitry stages; and time gating circuitry that includes, or is coupled to, a clock circuit that maintains a first time clock, the time gating circuitry configured to i) receive the timestamped packet and the timing information from the one or more circuitry stages, ii) determine when a current time indicated by the clock circuit reaches the transmit time that is included in the timing information, iii) hold the timestamped packet from proceeding to the network interface prior to the current time reaching the transmit time, and iv) release the timestamped packet, embedded with the future timestamp that is associated with the transmit time, in response to the current time reaching the transmit time so that the timestamped packet, embedded with the future timestamp that is associated with the transmit time, is transmitted by the network interface at the transmit time via the network link that is external to the network device, the future timestamp being embedded in the packet to indicate to a receiving device that receives the packet via the network link a time at which the timestamped packet was transmitted by the network device to enable the receiving device to synchronize a second time clock of the receiving device to the first time clock.

2. The network device of claim 1, wherein:
the one or more circuitry stages are disposed between the timestamp circuitry and the time gating circuitry; and
the timestamp circuitry is configured to embed in the packet a future timestamp that is associated with a transmit time that is equal to or exceeds a sum of i) a time at which the future timestamp is embedded in the packet and ii) an assumed maximum processing time of the one or more circuitry stages configured to process the timestamped packet between the timestamp circuitry and the time gating circuitry.

3. The network device of claim 2, wherein the one or more circuitry stages configured to process the timestamped packet between the timestamp circuitry and the time gating circuitry comprises:
authentication information generation circuitry that is configured to generate authentication information using contents of the timestamped packet, including the future timestamp embedded in the timestamped packet.

4. The network device of claim 3, wherein the authentication information generation circuitry is further configured to embed the authentication information in the timestamped packet.

5. The network device of claim 1, wherein:
the time gating circuitry is configured to receive the timing information and use the timing information to determine when the current time indicated by the clock circuit reaches the transmit time.

6. The network device of claim 5, wherein the one or more circuitry stages disposed between the timestamp circuitry and the time gating circuitry comprises:
encryption circuitry that is configured to encrypt contents of the timestamped packet, including the future timestamp embedded in the timestamped packet.

7. The network device of claim 1, wherein:
the timestamp circuitry is configured to append the timing information to the timestamped packet; and
the time gating circuitry is configured to remove the timing information appended to the timestamped packet prior to releasing the timestamped packet, embedded with the future timestamp that is associated with the transmit time, to the network interface.

8. The network device of claim 1, wherein the timestamp circuitry includes an adder circuit configured to generate the future timestamp at least by adding a time offset to a time indicated by the clock circuit.

9. The network device of claim 1, wherein the time gating circuitry includes a comparator circuit configured to i) compare the current time to the transmit time, and ii) generate a control signal that indicates when the current time has reached the transmit time.

10. The network device of claim 9, wherein the time gating circuitry further includes a gate circuit that is configured to i) receive the control signal, and ii) selectively release the timestamped packet, embedded with the future timestamp that is associated with the transmit time, to the network interface based on the control signal.

11. The network device of claim 1, wherein the time gating circuitry further comprises:
a pause circuit configured to cause a previous circuitry stage coupled to the time gating circuitry to pause sending packet data to the time gating circuitry in response to determining that the current time has not reached the transmit time.

12. The network device of claim 11, further comprising:
the previous circuitry stage, wherein the previous circuitry stage is configured to process contents of the timestamped packet prior to the time gating circuitry receiving the contents of the timestamped packet;
wherein the pause circuit includes a pause signal generator circuit configure to generate a pause signal that causes the previous circuitry stage to pause sending packet data to the time gating circuitry, the pause signal generator circuit configured to generate the pause signal in response to determining that the current time has not reached the transmit time.

13. The network device of claim 1, wherein the timestamp circuitry is configured to embed the future timestamp in the packet as a Precision Time Protocol (PTP) timestamp.

14. A method for transmitting packets, the method comprising:
receiving, at a network device, a packet that is to be transmitted via a network interface of the network device that is external to the network device;
modifying, with timestamping circuitry, the packet by embedding a future timestamp in the packet to generate a timestamped packet that is formatted for transmission with the embedded future timestamp via the network link that is external to the network device, the future timestamp associated with a transmit time at which the timestamped packet is to be transmitted by the network interface, the transmit time occurring after the timestamping circuitry embeds the future timestamp in the packet;
generating, with the timestamp circuitry, timing information that is outside of the timestamped packet and that includes the transmit time;
processing, at the network device, contents of the timestamped packet with one or more circuitry stages after embedding the future timestamp in the packet;
synchronizing, by the one or more circuitry stages, passage of the timing information through the one or more circuitry stages;
determining, at the network device, when a current time reaches the transmit time, the current time generated by a clock circuit of the network device, the clock circuit maintaining a first time clock;

holding, at time gating circuitry of the network device, the timestamped packet from proceeding to the network interface prior to the current time reaching the transmit time; and releasing, by the time gating circuitry, the timestamped packet, embedded with the future timestamp that is associated with the transmit time, to the network interface in response to determining that the current time has reached the transmit time so that the timestamped packet, embedded with the future timestamp that is associated with the transmit time, is transmitted by the network interface at the transmit time via the network link that is external to the network device, the future timestamp being embedded in the packet to indicate to a receiving device that receives the packet via the network link a time at which the timestamped packet was transmitted by the network device to enable the receiving device to synchronize a second time clock of the receiving device to the first time clock.

15. The method of claim 14, wherein:

modifying the packet comprises embedding in the packet a future timestamp that is associated with a transmit time that is equal to or exceeds a sum of i) a time at which the future timestamp is embedded in the packet and ii) an assumed maximum processing time of the one or more circuitry stages.

16. The method of claim 15, wherein:

processing the contents of the timestamped packet with the one or more circuitry stages comprises generating, by the one or more circuitry stages, authentication information using contents of the timestamped packet, including the future timestamp embedded in the timestamped packet.

17. The method of claim 16, wherein:

processing the contents of the timestamped packet with the one or more circuitry stages further comprises embedding, by authentication circuitry, the authentication information in the timestamped packet.

18. The method of claim 14, further comprising:

providing, at the network device, the timing information to the time gating circuitry via the one or more circuitry stages that process the contents of the timestamped packet after the future timestamp is embedded in the packet;

wherein determining when the current time reaches the transmit time comprises using the timing information to determine when the current time reaches the transmit time.

19. The method of claim 18, wherein:

processing the contents of the timestamped packet with the one or more circuitry stages comprises encrypting, by encryption circuitry, contents of the timestamped packet, including the future timestamp embedded in the timestamped packet.

20. The method of claim 14, further comprising:

appending, by the timestamp circuitry, the timing information to the timestamped packet; and removing, by the time gating circuitry, the timing information appended to the timestamped packet prior to releasing the packet to the network interface.

21. The method of claim 14, further comprising:

adding, by an adder circuit, a time offset to a time indicated by the clock circuit to generate the future timestamp.

22. The method of claim 14, further comprising:

comparing, by a comparator circuit, the current time to the transmit time; and generating, by the comparator circuit, a control signal that indicates when the current time has reached the transmit time.

23. The method of claim 22, further comprising:

receiving, at a gate circuit, the control signal; and selectively releasing, by the gate circuit, the timestamped packet to the network interface based on the control signal so that the timestamped packet, embedded with the future timestamp that is associated with the transmit time, is transmitted by the network interface at the transmit time.

24. The method of claim 14, further comprising:

processing, by the previous circuitry stage, contents of the timestamped packet prior to the time gating circuitry receiving the contents of the packet; and generating, by the time gating circuitry, a pause signal to cause the previous circuitry stage to pause sending contents of the packet to the time gating circuitry, the pause signal generated in response to determining that the current time has not reached the transmit time.

25. The method of claim 14, further comprising:

causing a previous circuitry stage to pause sending packet data to the time gating circuitry in response to determining that the current time has not reached the transmit time.

26. The method of claim 14, wherein embedding the future timestamp in the packet comprises:

embedding the future timestamp in the packet as a Precision Time Protocol (PTP) timestamp.

* * * * *